US010957022B2

(12) United States Patent
Kim et al.

(10) Patent No.: US 10,957,022 B2
(45) Date of Patent: Mar. 23, 2021

(54) ELECTRONIC DEVICE FOR PROCESSING IMAGE ACQUIRED BY USING CAMERA AND METHOD FOR OPERATING THE SAME

(71) Applicant: Samsung Electronics Co., Ltd., Suwon-si (KR)

(72) Inventors: Sung-Oh Kim, Suwon-si (KR); Seong-Woon Kim, Seongnam-si (KR); Jae-Gon Kim, Hwaseong-si (KR); Hyun-Hee Park, Seoul (KR); Yung-Mok Yu, Seongnam-si (KR); Sang-Hyeon Lim, Hwaseong-si (KR); Jong-Bum Choi, Yongin-si (KR); Il-Do Kim, Suwon-si (KR); Kwang-Tai Kim, Yongin-si (KR); Ha-Joong Park, Suwon-si (KR); Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 15/986,438

(22) Filed: May 22, 2018

(65) Prior Publication Data
US 2018/0336666 A1 Nov. 22, 2018

(30) Foreign Application Priority Data

May 22, 2017 (KR) .......................... 10-2017-0062956

(51) Int. Cl.
*G06T 5/00* (2006.01)
*G06T 7/40* (2017.01)
(Continued)

(52) U.S. Cl.
CPC ................ *G06T 5/005* (2013.01); *G06T 3/40* (2013.01); *G06T 5/50* (2013.01); *G06T 7/40* (2013.01); *G06T 7/70* (2017.01)

(58) Field of Classification Search
None
See application file for complete search history.

(56) References Cited

U.S. PATENT DOCUMENTS 9,311,735 B1 * 4/2016 Amirghodsi ............ G06T 5/005
9,424,255 B2 * 8/2016 Pengelly ................. G06F 40/58
(Continued)

FOREIGN PATENT DOCUMENTS

| EP | 1453002 A2 | 9/2004 |
|---|---|---|
| JP | 2004062604 A | 2/2004 |
| KR | 10-2006-0121752 A | 11/2006 |

OTHER PUBLICATIONS

International Search Report dated Oct. 8, 2018 in connection with International Patent Application No. PCT/KR2018/005803, 6 pages.
(Continued)

*Primary Examiner* — Leon Viet Q Nguyen

(57) ABSTRACT

An electronic device is disclosed. The electronic device includes a camera, a communication module, and a processor. The processor is operably coupled with the camera and the communication module. The processor is configured to obtain a first image corresponding to an external object using the camera. The processor is also configured to generate a second image smaller in data size than the first image using the first image. The processor is further configured to transmit the second image to an external electronic device through the communication module. The processor is also configured to receive correction area information from the external electronic device through the communication module. The correction area information is based on information associated with an image area identi-
(Continued)

fied from the second image. The processor is further configured to perform correction using the first image based on at least part of the correction area information.

20 Claims, 28 Drawing Sheets

(51) Int. Cl.
*G06T 3/40* (2006.01)
*G06T 5/50* (2006.01)
*G06T 7/70* (2017.01)

(56) References Cited

U.S. PATENT DOCUMENTS

| | | | |
|---|---|---|---|
| 2002/0181801 A1 | 12/2002 | Needham et al. | |
| 2006/0268357 A1* | 11/2006 | Vook | H04N 1/00244 358/448 |
| 2008/0292219 A1 | 11/2008 | Keall et al. | |
| 2009/0063431 A1* | 3/2009 | Erol | G06K 9/6293 |
| 2011/0034176 A1 | 2/2011 | Lord et al. | |
| 2013/0170738 A1* | 7/2013 | Capuozzo | G06K 9/66 382/159 |
| 2014/0314284 A1* | 10/2014 | Movellan | G06K 9/6262 382/118 |
| 2014/0341425 A1 | 11/2014 | Babacan et al. | |
| 2015/0055824 A1* | 2/2015 | Hong | G06K 9/4652 382/103 |
| 2015/0172539 A1 | 6/2015 | Neglur | |
| 2015/0221066 A1 | 8/2015 | Kobayashi | |
| 2016/0217590 A1* | 7/2016 | Mullins | G06T 7/40 |

OTHER PUBLICATIONS

Written Opinion of the International Searching Authority dated Oct. 8, 2018 in connection with International Patent Application No. PCT/KR2018/005803, 8 pages.

European Patent Office, "Supplementary European Search Report," Application No. EP 18805351.6, dated Jan. 2, 2020, 8 pages.

Notification of the Reasons for Rejection dated Feb. 8, 2021 in connection with Korean Application No. 10-2017-0062956, 18 pages.

\* cited by examiner

ELECTRONIC DEVICE FOR PROCESSING IMAGE ACQUIRED BY USING CAMERA AND METHOD FOR OPERATING THE SAME

CROSS-REFERENCE TO RELATED APPLICATION AND CLAIM OF PRIORITY

This application is based on and claims priority under 35 U.S.C. § 119 to Korean Patent Application No. 10-2017-0062956, filed on May 22, 2017, in the Korean Intellectual Property Office, the disclosure of which is incorporated by reference herein in its entirety.

TECHNICAL FIELD

Various embodiments of the disclosure relate to electronic devices processing images obtained using cameras and methods for operating the same.

BACKGROUND

Image processing electronic devices are able to obtain raw images through image sensors and process the obtained raw images via use of their embedded image signal processors (ISP). The image signal processors may process the received raw images using image quality enhancer algorithms and may thus provide image quality-enhanced images. Image processors may perform various types of processing, such as white balancing, color adjustment (e.g., color matrix, color correction, or color enhancement), color filter array interpolation, nose reduction or sharpening, image enhancement, e.g., high-dynamic-range (HDR), face detection, etc. Images output from image signal processors may have, e.g., the YUV format. Images output from image signal processors may be, e.g., JPEG-compressed, and the compressed images may be stored in electronic devices.

Meanwhile, image processing cloud system services are being provided to back up images and generate new media content. Image matching schemes or other computer vision-based techniques difficult to perform on terminal devices may be applied to images uploaded on cloud servers. For example, cloud servers may carry out image recognition using machine learning-based software.

ISPs are typically placed inside application processors (APs) of electronic devices. This causes a rise in chip cost and overheat issues. As sensor specifications vary and processing algorithms are modified accordingly, new hardware types of ISPs need to be equipped in image processing electronic devices.

The above information is presented as background information only to assist with an understanding of the present disclosure. No determination has been made, and no assertion is made, as to whether any of the above might be applicable as prior art with regard to the present disclosure.

SUMMARY

According to an embodiment of the disclosure, an image processing electronic device is able to obtain image correction information from a cloud server, which is difficult, or takes a long time, for an ISP of an electronic device to produce, and process images using the correction information obtained. Thus, image correction may be achieved by a state-of-art algorithm.

According to an embodiment of the disclosure, an electronic device may comprise a camera, a communication module, and a processor functionally connected with the camera and the communication module, wherein the processor may be configured to obtain a first image corresponding to an external object using the camera, generate a second image smaller in data size than the first image using the first image, transmit the second image to an external electronic device through the communication module so that the external electronic device generates correction area information based on information associated with an image area identified from the second image, receive the generated correction area information from the external electronic device through the communication module, and perform correction using the first image based on at least part of the correction area information.

According to an embodiment of the disclosure, an electronic device may comprise a communication module and a processor functionally connected with the communication module, wherein the processor may be configured to obtain a first image through the communication module from another electronic device, identify at least one image area from the first image based on first image recognition, generate correction area information corresponding to the first image based on, at least, information associated with the at least one image area, and transmit the correction area information through the communication module to an external electronic device.

According to an embodiment of the disclosure, an electronic device may comprise a camera, a communication module, and a processor functionally connected with the camera and the communication module, wherein the processor may be configured to obtain a first image corresponding to an external object using the camera, generate a second image smaller in data size than the first image using the first image, transmit the second image to an external electronic device through the communication module so that the external electronic device generates pixel adjustment information to adjust each of pixels in at least a portion of the second image, receive the generated pixel adjustment information from the external electronic device through the communication module, and correct each of the pixels in the at least portion of the first image using the received pixel adjustment information.

According to an embodiment of the disclosure, an electronic device may comprise a camera, a communication module, a display, and a processor functionally connected with the camera and the communication module, wherein the processor may be configured to obtain a first image corresponding to an external object using the camera, generate a second image smaller in data size than the first image using the first image, transmit the first image and the second image through the communication module to an external electronic device, receive, from the external electronic device through the communication module, an image encoded after the first image is corrected by correction area information obtained by the second image, decode the received encoding image and display the decoded image, receive, from the external electronic device through the communication module, an image compressed after the first image is corrected, in response to the transmission, and store the received compressed image.

According to an embodiment of the disclosure, an electronic device may comprise a camera, a communication module, and a processor functionally connected with the camera and the communication module, wherein the processor may be configured to obtain a plurality of images for constituting a video using the camera, generate a first lightweight image smaller in data size than a first image using the first image included in a first section of the plurality of images, transmit the first lightweight image through the communication module to an external electronic device, receive first correction area information generated based on the first lightweight image, correct images included in the first section based on the first correction area information, generate a second lightweight image smaller in data size than the first image using a second image included in a second section of the plurality of images, transmit the second lightweight image through the communication module to the external electronic device, receive second correction area information generated based on the second lightweight image, and correct images included in the second section based on the second correction area information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
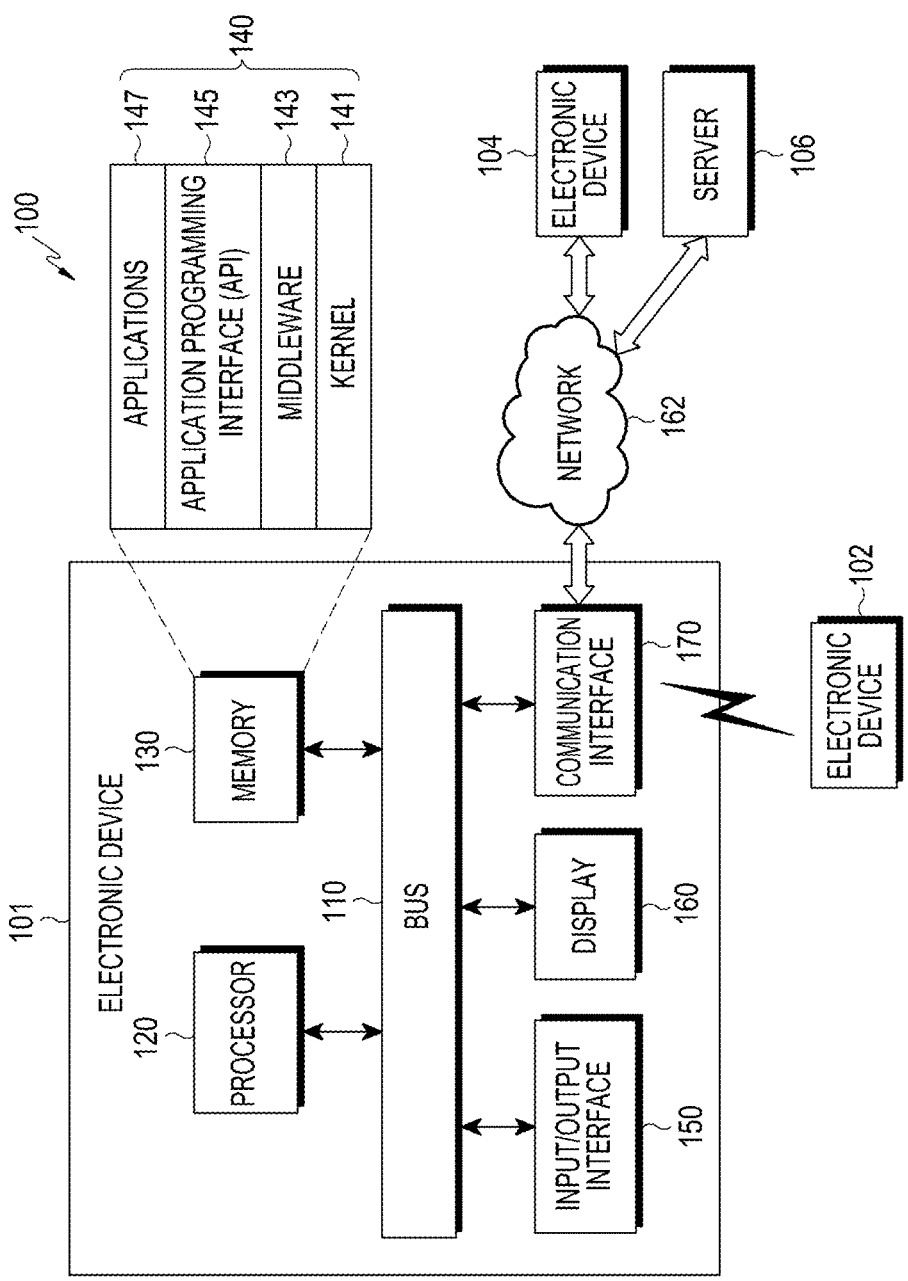
FIG. 1 illustrates a block diagram of an electronic device and a network according to an embodiment of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., SAMSUNG HOMESYNC, APPLE TV, or GOOGLE TV), a gaming console (XBOX, PLAYSTATION), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
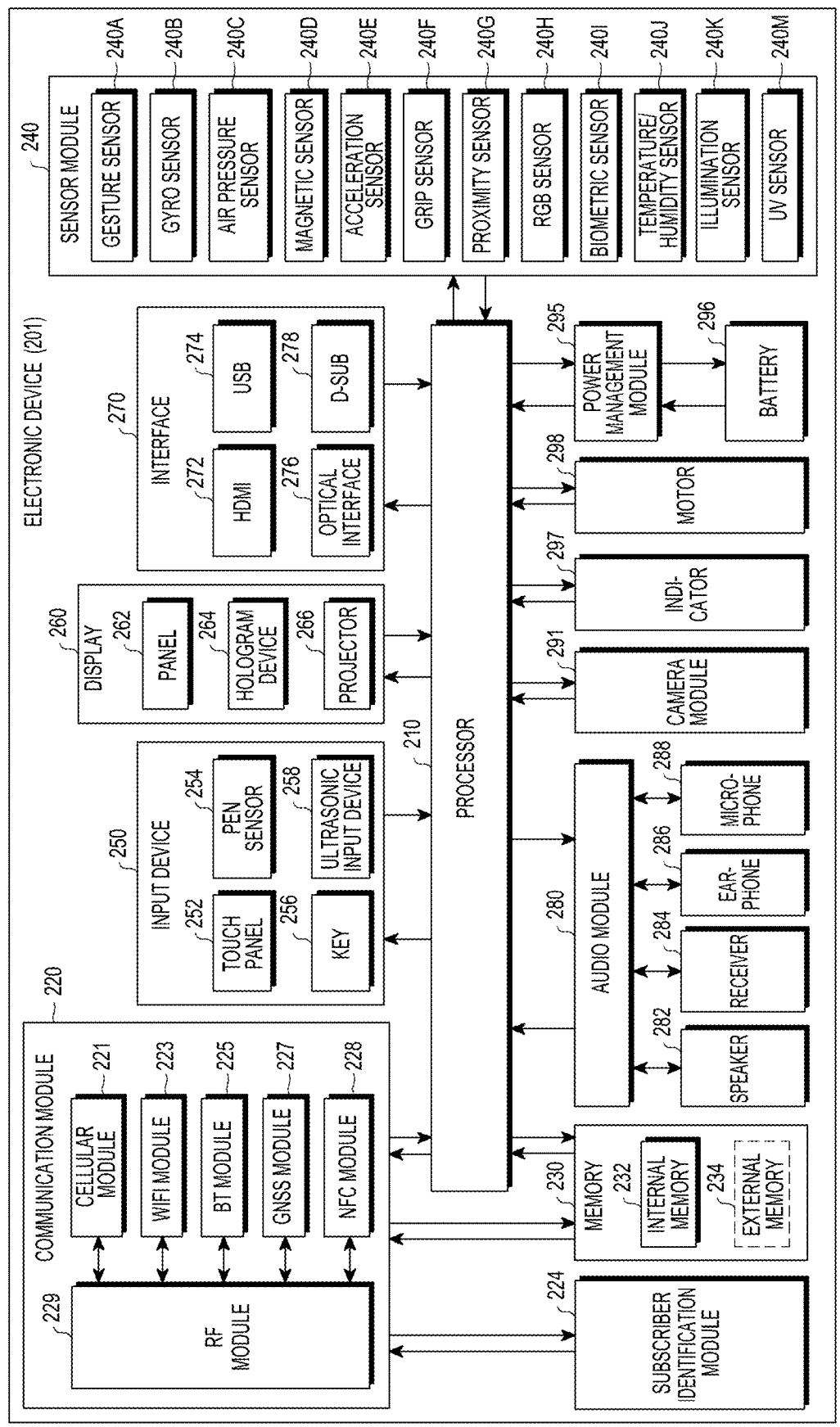
FIG. 2 illustrates a block diagram of an electronic device according to an embodiment of the present disclosure.

FIG. 2 illustrates a block diagram of an electronic device 201 according to an embodiment of the present disclosure. An electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 (e.g., the communication interface 170) may have the same or similar configuration to the communication interface 170 of FIG. 1. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. According to an embodiment of the present disclosure, the cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 1210 is in a sleep mode. At least part of the sensor module 240 may be included in the sensor 195 of FIG. 1.

The input device 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery. A discharging device 292 may receive power from the battery 296 to generate heat when the battery 296 is in an abnormal state. Here, the battery 296 may be, e.g., a battery pack. A sensing circuit 293 may be a circuit capable of determining an abnormal state of the battery 296, and the sensing circuit 293 may include at least one of, e.g., a voltage sensor, a current sensor, a temperature sensor, and a gas sensor. Besides sensing, the sensing circuit 293 may connect or disconnect the discharging device 292 from the battery 296 and may output control signals for controlling, e.g., field effect transistors (FETs). The sensing circuit 293 may be operated independently from the processor 120 or under the control of the processor 120.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

According to an embodiment of the present disclosure, a processor (e.g., the processor 120 or the processor 210) may be functionally connected with a camera (e.g., the camera module 291) and a communication module (e.g., the communication interface 170 or the communication module 220). The processor may be configured to obtain a first image corresponding to an external object using the camera, generate a second image smaller in data size than the first image using the first image, transmit the second image to an external electronic device through the communication module so that the external electronic device generates correction area information based on information associated with an image area identified from the second image, receive the generated correction area information from the external electronic device through the communication module, and perform correction using the first image based on at least part of the correction area information.

According to an embodiment of the present disclosure, the processor (e.g., the processor 120 or the processor 210) may be configured to generate the second image by performing at least one of adjusting a resolution of the first image, selecting at least some of a plurality of frequency bands of the first image, or selecting at least one of a plurality of bit plain levels of the first image.

According to an embodiment of the present disclosure, the processor (e.g., the processor 120 or the processor 210) may be configured to transmit the first image through the communication module to the external electronic device so that the external electronic device generates other correction area information using the first image and the correction area information.

According to an embodiment of the present disclosure, the processor (e.g., the processor 120 or the processor 210) may be configured to receive, through the communication module (e.g., the communication interface 170 or the communication module 220), the other correction area information or a fourth image generated by the external electronic device correcting the first image using the other correction area information.

According to an embodiment of the present disclosure, the information associated with the at least one image area may include at least one of a position of a first object included in the second image, a result of object recognition of the first object, a reliability of the result of the object recognition of the first object, a position of a second object included in the second image, a result of texture recognition of the second object, or an accuracy of the texture recognition of the second object.

According to an embodiment of the present disclosure, the processor (e.g., the processor 120 or the processor 210) may be configured to receive the correction area information further including image classification information from the external electronic device through the communication module (e.g., the communication interface 170 or the communication module 220) and correct the first image using at least one of the image classification information or the information associated with the image area.

According to an embodiment of the present disclosure, the processor (e.g., the processor 120 or the processor 210) may be configured to display the corrected image through the display (e.g., the display 160).

According to an embodiment of the present disclosure, the processor (e.g., the processor 120 or the processor 210) may be configured to transmit metadata associated with the first image through the communication module to the external electronic device and receive, through the communication module, the correction area information generated by the external electronic device using the metadata and the second image.

According to an embodiment of the present disclosure, the processor (e.g., the processor 120 or the processor 210) may be configured to perform at least one of applying a first effect corresponding to a result of recognition of an object for a pixel of the first image corresponding to a position of the object included in the correction area information or applying a second effect corresponding to classification information for the first image.

According to an embodiment of the present disclosure, the processor (e.g., the processor 120 or the processor 210) may be configured to generate the corrected first image using a format different from a format of the first image, as part of the correction.

According to an embodiment of the present disclosure, the processor (e.g., the processor 120 or the processor 210) may be configured to generate the second image and a fifth image, which together with the second image constitutes the first image, using the first image and transmit the fifth image through the communication module to the external electronic device so that the external electronic device constitutes the first image with the second image and the fifth image and generates other correction area information using the correction area information and the first image.

According to an embodiment of the present disclosure, the processor (e.g., the processor 120 or the processor 210) may be configured to select some of a plurality of frequency bands of the first image to generate the second image and select others of the plurality of frequency bands to generate the fifth image, to select some of a plurality of bit plains of the first image to generate the second image and select others of the plurality of bit plains to generate the fifth image, or to down-scale the first image to generate the second image, up-scale the second image into a resolution of the first image, and obtain a difference between the up-scaled image and the first image to generate the fifth image.

According to an embodiment of the present disclosure, the electronic device (e.g., the server 106) may include a communication module and a processor functionally connected with the communication module. The processor may be configured to obtain a first image through the communication module from another electronic device (e.g., the electronic device 101), identify at least one image area from the first image based on first image recognition, generate correction area information corresponding to the first image based on, at least, information associated with the at least one image area, and transmit the correction area information through the communication module to an external electronic device.

According to an embodiment of the present disclosure, the processor (e.g., the processor 120 or the processor 210) may be configured to generate classification information corresponding to the first image based on second image recognition and generate the correction area information based on at least one of the classification information or the information associated with the at least one image area.

According to an embodiment of the present disclosure, the processor (e.g., the processor 120 or the processor 210) may be configured to receive the first image through the communication module from the external electronic device.

According to an embodiment of the present disclosure, the processor (e.g., the processor 120 or the processor 210) may be configured to identify at least one area corresponding to an object from the at least one image area and generate the correction area information using information related to the object.

According to an embodiment of the present disclosure, the processor (e.g., the processor 120 or the processor 210) may be configured to identify at least one area corresponding to a texture from the at least one image area and generate the correction area information using information related to the texture.

According to an embodiment of the present disclosure, the processor (e.g., the processor 120 or the processor 210) may be configured to determine at least one reliability corresponding to splitting or classifying the at least one image area and generate the correction area information using the at least one reliability.

According to an embodiment of the present disclosure, the processor (e.g., the processor 120 or the processor 210) may be configured to receive a second image different in size from the first image from the external electronic device through the communication module and generate other correction area information using the second image and the correction area information.

According to an embodiment of the present disclosure, the processor (e.g., the processor 120 or the processor 210) may be configured to generate a third image corrected using the second image based on at least part of the other correction area information.

According to an embodiment of the present disclosure, the processor (e.g., the processor 120 or the processor 210) may be configured to identify a first area and a second area of the second image for the correction based on at least part of the other correction area information, correct the first area using first correction information designated corresponding to the first area, and correct the second area using second correction information designated corresponding to the second area.

According to an embodiment of the present disclosure, a processor (e.g., the processor 120 or the processor 210) of an electronic device (e.g., the electronic device 101) may be configured to obtain a first image corresponding to an external object using the camera, generate a second image smaller in data size than the first image using the first image, transmit the second image to an external electronic device through the communication module so that the external electronic device generates pixel adjustment information to adjust each of pixels in at least a portion of the second image, receive the generated pixel adjustment information from the external electronic device through the communication module, and correct each of the pixels in the at least portion of the first image using the received pixel adjustment information.

According to an embodiment of the present disclosure, the processor (e.g., the processor 120 or the processor 210) of the electronic device (e.g., the electronic device 101) may be configured to obtain a first image corresponding to an external object using the camera, generate a second image smaller in data size than the first image using the first image, transmit the first image and the second image through the communication module to an external electronic device, receive, from the external electronic device through the communication module, an image encoded after the first image is corrected by correction area information obtained by the second image, decode the received encoding image and display the decoded image, receive, from the external electronic device through the communication module, an image compressed after the first image is corrected, in response to the transmission, and store the received compressed image.

According to an embodiment of the present disclosure, the processor (e.g., the processor 120 or the processor 210) of the electronic device (e.g., the electronic device 101) may be configured to obtain a plurality of images for constituting a video using the camera, generate a first lightweight image smaller in data size than a first image using the first image included in a first section of the plurality of images, transmit the first lightweight image through the communication module to an external electronic device, receive first correction area information generated based on the first lightweight image, correct images included in the first section based on the first correction area information, generate a second lightweight image smaller in data size than the first image using a second image included in a second section of the plurality of images, transmit the second lightweight image through the communication module to the external electronic device, receive second correction area information generated based on the second lightweight image, and correct images included in the second section based on the second correction area information.

According to an embodiment of the present disclosure, the processor (e.g., the processor 120 or the processor 210) may be configured to, upon detecting an image whose difference from an image in the first section exceeds a designated threshold, determine an end of the first section, classify the image whose difference exceeds the designated threshold as being in the second section, and transmit the second lightweight image.

Figure 3:
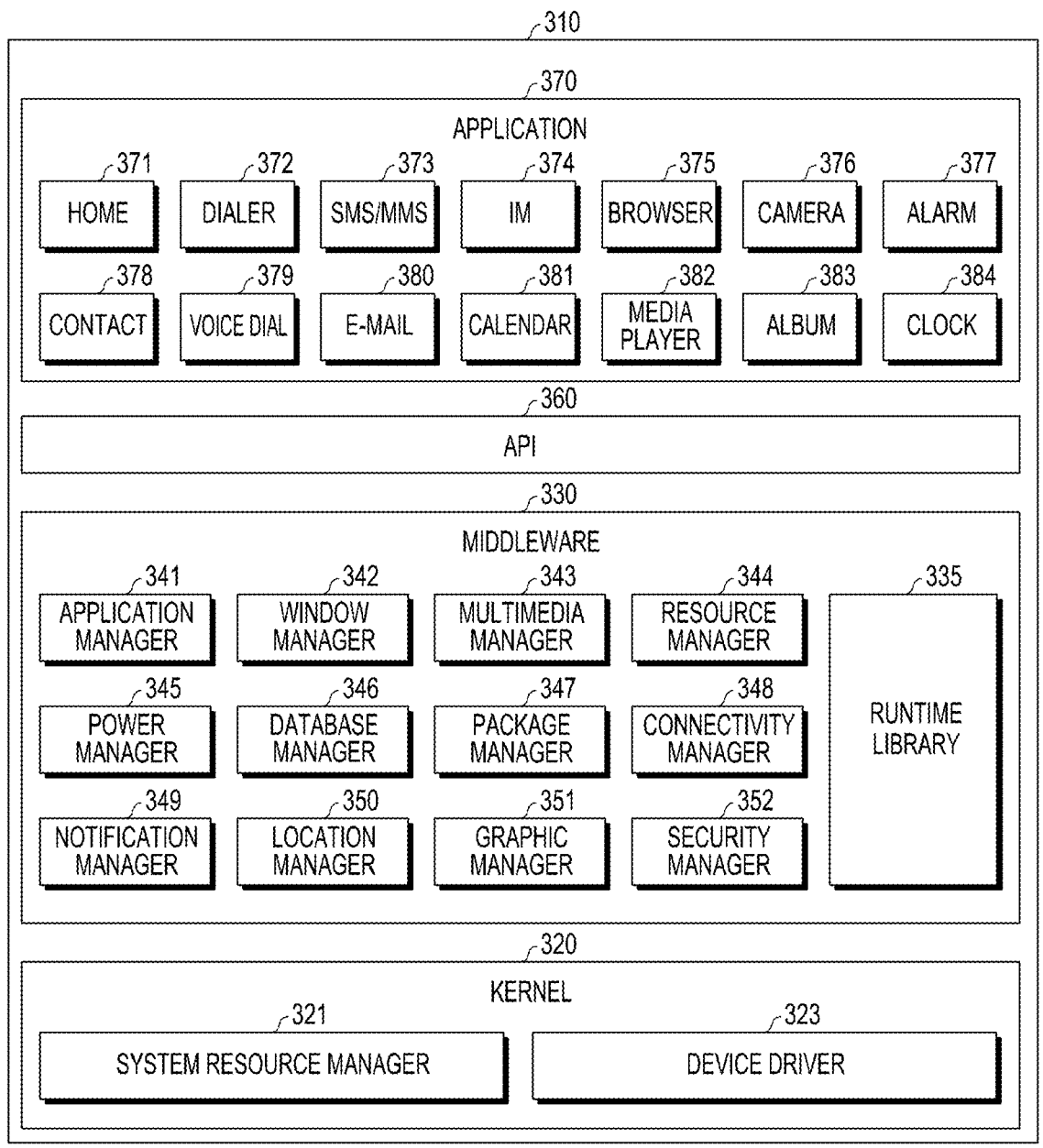
FIG. 3 illustrates a block diagram of a program module according to an embodiment of the present disclosure.

FIG. 3 illustrates a block diagram of a program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., ANDROID, IOS, WINDOWS, SYMBIAM, TIZEN, or BADA. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
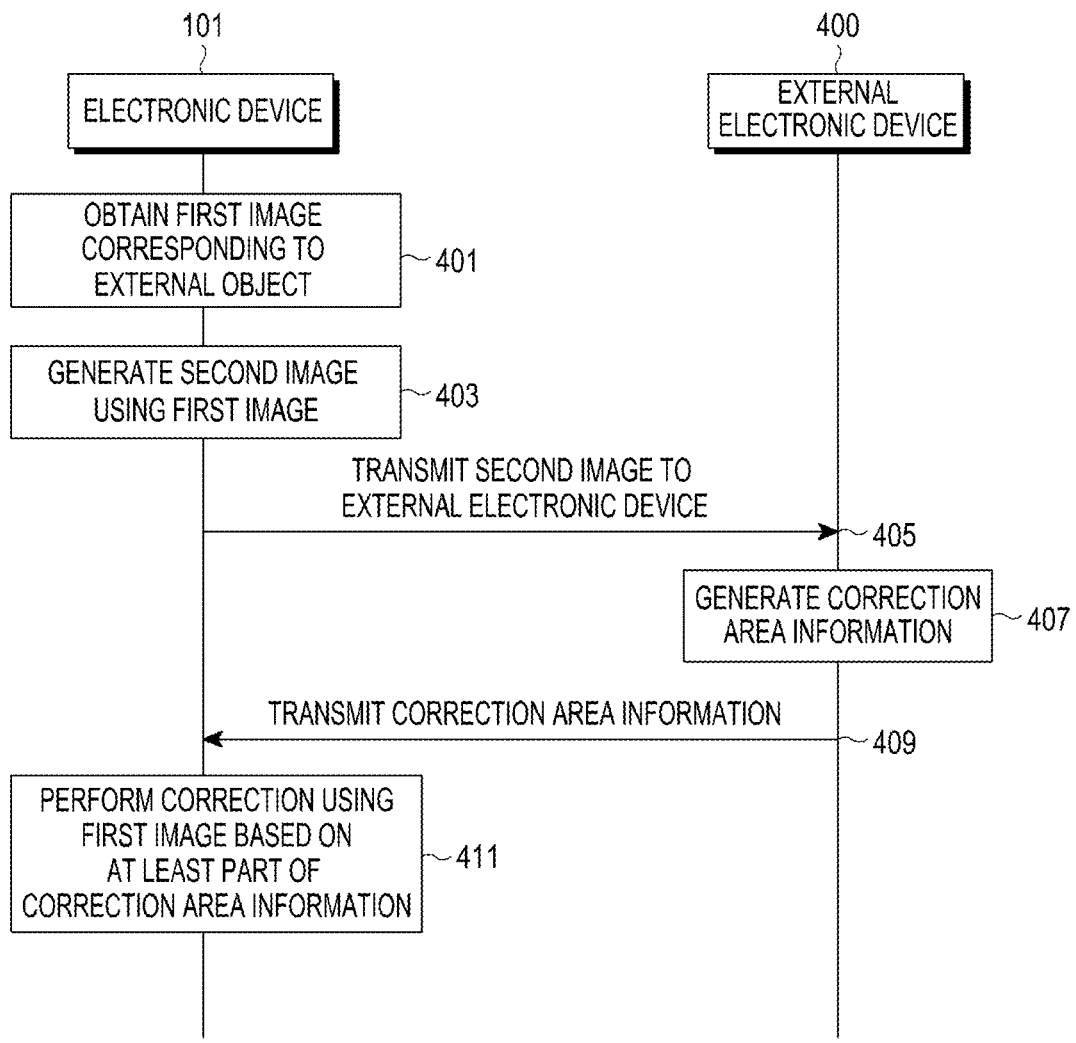
FIG. 4A illustrates a flowchart depicting the operations of an electronic device and an external electronic device according to an embodiment of the present disclosure.

FIG. 4A illustrates a flowchart depicting the operations of an electronic device and an external electronic device according to an embodiment of the present disclosure.

According to an embodiment of the present disclosure, an electronic device 101 (e.g., the processor 120 or 210) may obtain a first image corresponding to an external object using, e.g., the camera module 291, in operation 401. The electronic device 101 (e.g., the processor 120 or 210) may obtain the first image through a sensor (e.g., the camera module 291) capable of sensing images. Here, the first image may be a raw image that may be implemented in various formats, such as a bayer format, a format processed by a color filter array (CFA) pattern, a layer-structure format generated by sensing all of the three colors from one pixel, and a format generated as different types of parallax information are obtained by one pixel.

In operation 403, the electronic device 101 (e.g., the processor 120 or 210) may generate a second image, which is smaller in data size than the first image, using the first image. The electronic device 101 (e.g., the processor 120 or 210) may generate the second image by reducing the volume of the first image. Thus, the second image may be referred to as a lightweight image or small raw image. For example, the electronic device 101 may generate the second image using various down-scale schemes or down-sampling schemes. The electronic device 101 may generate the second image smaller in data size than the first image by performing at least one of, e.g., adjusting the resolution of the first image, selecting at least some of multiple frequency bands, or selecting at least one of a plurality of bit plain levels. The electronic device 101 may generate the second image by, e.g., extracting a low-frequency band from the first image. The electronic device 101 may generate the second image by selecting some bit plain levels from among a plurality of bit plain levels of the first image. The second image may be an image that contains part of information about the first image and that is smaller in volume than the first image. Where the electronic device 101 transmits the second image, instead of the first image, to an external electronic device, the electronic device 101 may send a smaller volume of information, thus enabling quicker transmission of images to the external electronic device 400. In operation 405, the electronic device 101 (e.g., the processor 120 or 210) may transmit the first image or the second image to the external electronic device 400 through, e.g., the communication interface 170 or the communication module 220, so that the external electronic device 400 may generate correction area information based on at least one of information associated with at least one image area identified from the second image or classification information about the second image. In operation 407, the external electronic device 400 (e.g., a processor of the external electronic device 400) may generate the correction area information. For example, the external electronic device 400 (e.g., a processor of the external electronic device 400) may perform segmentation on the second image and identify at least one image area from the second image based on a result of the segmentation. The external electronic device 400 (e.g., a processor of the external electronic device 400) may also recognize at least one image area by applying an object recognition algorithm or texture recognition algorithm on the image area. The external electronic device 400 (e.g., a processor of the external electronic device 400) may recognize at least one image area using various recognition algorithms, or the external electronic device 400 (e.g., a processor of the external electronic device 400) may recognize at least one image area using a recognition algorithm obtained via machine learning or deep learning. For example, the external electronic device 400 (e.g., a processor of the external electronic device 400) may obtain image area-associated information indicating that pixel coordinates (100, 101), (100, 102), (101, 102), and (101, 103) are human teeth. Here, the pixel coordinates may correspond to pixel coordinates of the first image. The external electronic device 400 (e.g., a processor of the external electronic device 400) may obtain classification information indicating, e.g., that the second image is classified as "people in the street." The external electronic device 400 (e.g., a processor of the external electronic device 400) may obtain classification information using a result of the recognition, or without the recognition process, may obtain the classification information using, e.g., a color distribution in the second image. The external electronic device 400 (e.g., a processor of the external electronic device 400) may generate correction area information including at least one of the classification information or information associated with at least one image area obtained through the above-described process.

In operation 409, the external electronic device 400 (e.g., a processor of the external electronic device 400) may transmit the correction area information to the electronic device 101 through, e.g., a communication interface or communication module of the external electronic device 400. The electronic device 101 (e.g., the processor 120 or 210) may receive the correction area information generated from the external electronic device 400 through, e.g., the communication interface 170 or communication module 220. In operation 411, the electronic device 101 (e.g., the processor 120 or 210) may correct the first image based on at least part of the correction area information. Accordingly, a third image where the first image has been corrected may be generated. The ISP of the electronic device 101 may correct the first image (e.g., a raw image) obtained from the image sensor using the correction area information received from the external electronic device 400. For example, using the image area-associated information indicating that the pixel coordinates (100, 101), (100, 102), (101, 102), and (101, 103) are human teeth, the electronic device 101 (e.g., the processor 120 or 210) may perform correction corresponding to human teeth on the corresponding image area. For example, the electronic device 101 (e.g., the processor 120 or 210) may process the colors at the pixel coordinates (100, 101), (100, 102), (101, 102), and (101, 103) in the first image into white, thereby obtaining a corrected image in which the teeth area in the first image has further been whitened. As set forth above, since the pixel coordinates of the second image may correspond to the pixel coordinates of the first image, the electronic device 101 (e.g., the processor 120 or 210) may correct the first image using information related to image areas in the second image. For example, the electronic device 101 (e.g., the processor 120 or 210) may perform correction corresponding to an outdoor environment, not an indoor environment, on the first image using the classification information indicating that "people in the street." The electronic device 101 (e.g., the processor 120 or 210) may store a third image obtained as a result of the correction of the first image. For example, the third image may have a YUV format different from that of the first image. The electronic device 101 (e.g., the processor 120 or 210) may store the third image in a video random access memory (VRAM) and display the stored image on a display (e.g., the display 160 or 260). The electronic device 101 (e.g., the processor 120 or 210) may compress the third image using a compression algorithm and store the compressed image in a memory (e.g., the memory 130 or 230).

As described above, the external electronic device 400 (e.g., a processor of the external electronic device 400) may perform segmentation and recognition, and the electronic device 101 (e.g., the processor 120 or 210) may correct images using a result of the recognition. Accordingly, although the ISP of the electronic device 101 is not of high performance, it may use the correction area information obtained via use of the high-performance ISP of the external electronic device 400. Since the external electronic device 400 may generate correction area information using a new recognition algorithm, if developed, and send it to the electronic device 101, the electronic device 101 may process images using the new recognition algorithm without exchanging the hardware ISP. Since lightweight images, such as the second image, are sent to the external electronic device 400, the time taken for the electronic device 101 to obtain the correction area information may be relatively short, thus enabling real-time image processing using the correction area information.

Figure 4B:
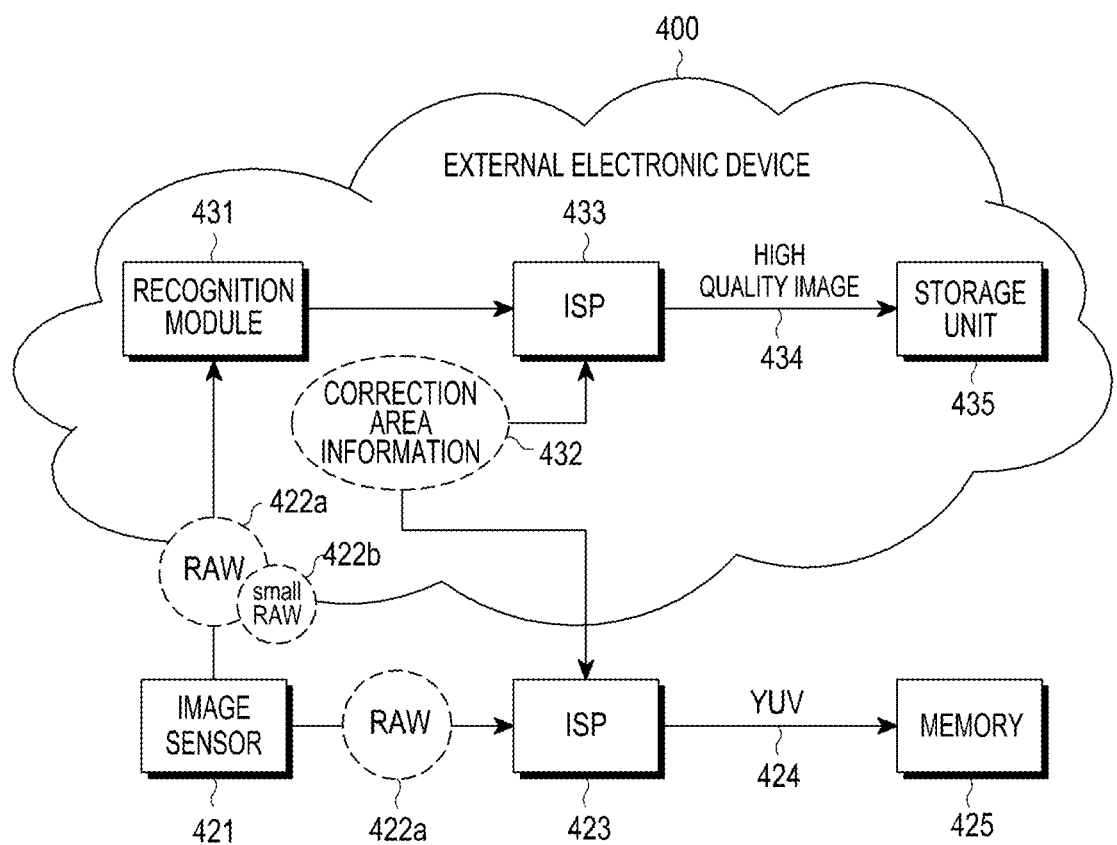
FIG. 4B illustrates a concept view depicting the operations of an electronic device and an external electronic device according to an embodiment of the present disclosure.

FIG. 4B illustrates a concept view depicting the operations of an electronic device and an external electronic device according to an embodiment of the present disclosure.

An electronic device 101 may include an image sensor 421, an ISP 423, and a memory 425. An external electronic device 400 may include a recognition module 431, an ISP 433, and a storage unit 435. The recognition module 431 may be a logic module and may be implemented as a processor of the external electronic device 400. The ISP 433 may also be implemented as a processor of the external electronic device 400. For example, the processor of the external electronic device 400 may perform both recognition and image processing. Although not shown, the electronic device 101 may include a communication module (e.g., the communication interface 170 or communication module 220) capable of transmitting and receiving data with the external electronic device 400. The external electronic device 400 may include a communication module capable of transmitting and receiving data with the electronic device 101.

The image sensor 421 (e.g., the camera module 291) may obtain an image for an external object and generate a raw image 422a corresponding to the image. The image sensor 421 may deliver the raw image 422a to the ISP 423. According to an embodiment of the present disclosure, the image sensor 421 may generate a small raw image 422b and send the small raw image 422b to the external electronic device 400 through the communication module. Alternatively, the processor of the electronic device 101, rather than the image sensor 421, may generate the small raw image 422b and send the generated small raw image 422b through the communication module to the external electronic device 400.

The recognition module 431 of the external electronic device 400 may obtain the small raw image 422b through the communication module and may perform segmentation on at least one image area from the small raw image 422b. The recognition module 431 may recognize each of at least one image area divided by the segmentation. Correction area information 432 may be generated which includes at least one of information associated with a plurality of image areas, e.g., information about the coordinates of the image areas, generated from the recognition module 431, or a result of recognition. The correction area information 432 may be sent to the electronic device 101. The ISP 423 may correct the raw image 422a using the correction area information 432, thereby generating a corrected image 424. The corrected image 424 may have, e.g., a YUV format. The corrected image 424 may be stored in the memory 425. The corrected image 424 may be compressed as per, e.g., a JPEG scheme, and the compressed image may be stored in the memory 425.

According to an embodiment of the present disclosure, the raw image 422a provided from the image sensor 421 may be sent to the external electronic device 400 separately from the small raw image 422b. Since the raw image 422a is large in volume as compared with the small raw image 422b, the small raw image 422b may be sent to the external electronic device 400, and the raw image 422a may then be sent to the external electronic device 400. For example, while the ISP 423 corrects the raw image 422a, the raw image 422a may be sent to the external electronic device 400. The raw image 422a may be uploaded onto the external electronic device 400, as generated by the image sensor 421, or a pre-treated image, which is one lens distortion compensated or noise-canceled, may be uploaded. The above-mentioned pre-treatment may be performed by the external electronic device 400. The external electronic device 400 may perform the pre-treatment for the purposes of demosaic processing, image format conversion, or raising image recognition rate. The ISP 433 of the external electronic device 400 may correct the received raw image 422a. The external electronic device 400 may correct the raw image 422a using the existing correction area information 432 generated or using expanded correction area information. The raw image 422a may have a higher resolution that the small raw image 422b. Thus, the ISP 433 of the external electronic device 400 may obtain expanded correction area information, which is further detailed, from the high-resolution image. The ISP 433 may also generate the expanded correction area information using the raw image 422a along with the existing correction area information 432 generated. The ISP 433 may obtain the high-resolution image (high-quality image) 434 by correcting the raw image 422a using the expanded correction area information. The high-resolution image 434 may be stored in the storage unit 435 of the external electronic device 400 and may be downloaded to the electronic device 101.

Figure 4C:
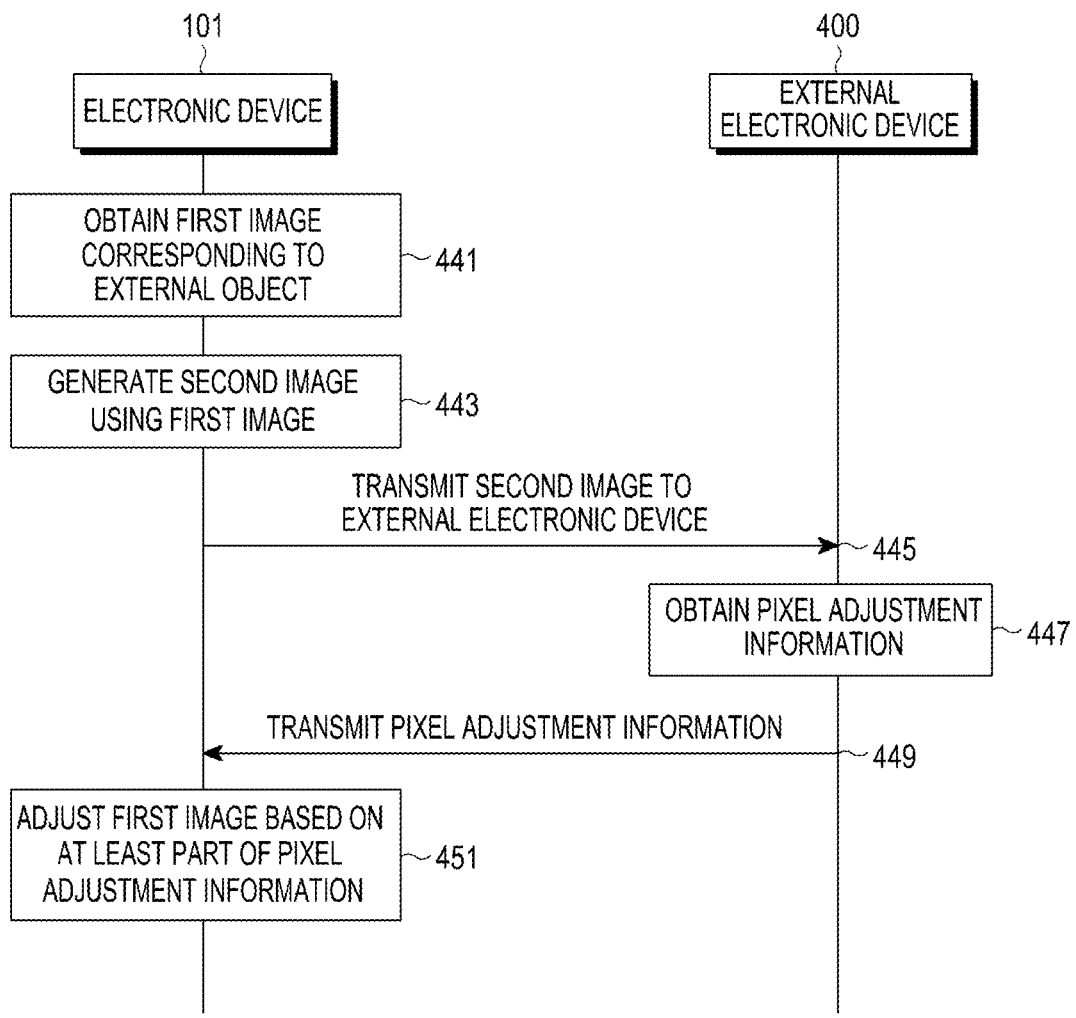
FIG. 4C illustrates a flowchart depicting a method for operating an electronic device and an external electronic device according to an embodiment of the present disclosure.

FIG. 4C illustrates a flowchart depicting a method for operating an electronic device and an external electronic device according to an embodiment of the present disclosure.

According to an embodiment of the present disclosure, an electronic device 101 (e.g., the processor 120 or 210) may obtain a first image corresponding to an external object using, e.g., the camera module 291, in operation 441. In operation 443, the electronic device 101 (e.g., the processor 120 or 210) may generate a second image, which is smaller in data size than the first image, using the first image. For example, the electronic device 101 (e.g., the processor 120 or 210) may obtain the second image smaller in size than the first image. In operation 445, the electronic device 101 (e.g., the processor 120 or 210) may transmit the second image to the external electronic device 400 through, e.g., the communication interface 170 or communication module 220. As set forth above, since the second image is smaller in size than the first image, the second image may be transmitted to the external electronic device 400 for a relatively short time.

In operation 447, the external electronic device 400 (e.g., a processor of the external electronic device 400) may obtain pixel adjustment information about the second image. For example, the external electronic device 400 (e.g., a processor of the external electronic device 400) may generate correction area information including at least one of image area coordinate information or a recognition result as described above in connection with FIGS. 4A and 4B. The external electronic device 400 (e.g., a processor of the external electronic device 400) may obtain adjustment information about each of the pixels in the second image based on the correction area information. For example, the external electronic device 400 (e.g., a processor of the external electronic device 400) may recognize that pixel coordinates (100, 101), (100, 102), (101, 102), and (101, 103) are teeth. The external electronic device may generate pixel adjustment information to process the colors at the pixel coordinates (100, 101), (100, 102), (101, 102), and (101, 103) into white. The pixel adjustment information may include the degree of adjustment of at least one of, e.g., per-pixel brightness, white-and-black, color, or color temperature. The pixel adjustment information may also be set per pixel group included in the second image. For example, the pixel adjustment information may include the degree of adjustment of at least one of the brightness, white-and-black, color, or color temperature of the pixels in a pixel group. In this case, as the size of the pixel adjustment information may be reduced as compared with when adjustment information is set for all the pixels, the electronic device 101 may more quickly obtain the pixel adjustment information. In operation 449, the external electronic device 400 (e.g., a processor of the external electronic device 400) may transmit the pixel adjustment information to the electronic device 101 through, e.g., a communication interface or communication module of the external electronic device 400. In operation 451, the electronic device 101 (e.g., the processor 120 or 210) may apply the pixel adjustment information to the first image, and may accordingly adjust at least one of the brightness, white-and-black, color, or color temperature per pixel in the first image. For example, the electronic device 101 (e.g., the processor 120 or 210) may perform a whitening process on the raw image at the pixel coordinates (100, 101), (100, 102), (101, 102), and (101, 103).

According to an embodiment of the present disclosure, the electronic device 101 (e.g., the processor 120 or 210) may transmit a small raw image through, e.g., the communication interface 170 or communication module 22, to the external electronic device 400, and the external electronic device 400 (e.g., a processor of the external electronic device 400) may transmit the pixel adjustment information in the second image using the small raw image, through, e.g., the communication interface or communication module of the external electronic device 400, to the electronic device 101. The electronic device 101 (e.g., the processor 120 or 210) may generate an image quality-enhanced, corrected image by applying the pixel adjustment information to the raw image.

Figure 5:
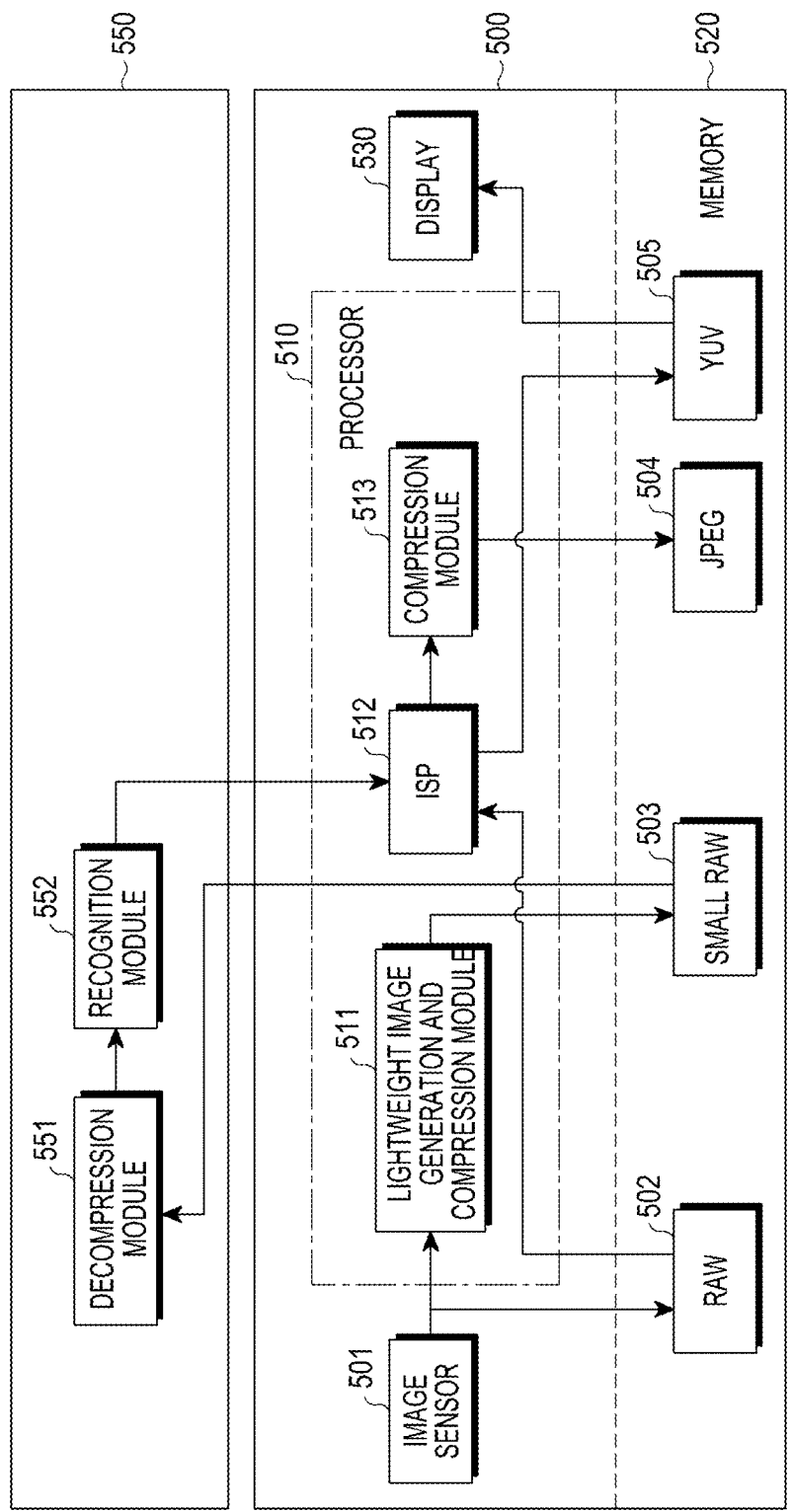
FIG. 5 illustrates a block diagram of an electronic device and an external electronic device according to an embodiment of the present disclosure.

FIG. 5 illustrates a block diagram of an electronic device and an external electronic device according to an embodiment of the present disclosure.

According to an embodiment of the present disclosure, an electronic device 500 (e.g., the electronic device 101 or electronic device 201) may include an image sensor 501, a processor 510, a memory 520, and a display 530. An external electronic device 500 may include a decompression module 551 and a recognition module 552. Operations performed by the decompression module 551 and the recognition module 552 may also be performed by the processor of the external electronic device 550.

The image sensor 501 (e.g., the camera module 291) may capture an external object and generate a raw image 502. The raw image 502 may transitorily or non-transitorily be stored in the memory 520 (e.g., a dynamic random access memory (DRAM)). The processor 510 may include a lightweight image generation and compression module 511, an ISP 512, and a compression module 513. The lightweight image generation and compression module 511, the ISP 512, and the compression module 513 may be, e.g., logic modules. Thus, operations performed by the lightweight image generation and compression module 511, the ISP 512, and the compression module 513 may be performed by the processor 510 (e.g., the processor 120 or 210). Alternatively, at least one of the lightweight image generation and compression module 511, the ISP 512, or the compression module 513 may be implemented in hardware inside the processor 510. The lightweight image generation and compression module 511 may receive a raw image 502 generated from the image sensor 501 and may generate a small raw image 503 from the raw image 502. The lightweight image generation and compression module 511 may compress the small raw image 503 and store the compressed small raw image 503 in the memory 520. The small raw image 503 may transitorily or non-transitorily be stored in the memory 520. A communication module (not shown) (e.g., the communication interface 170 or communication module 220) of the electronic device 500 may transmit the small raw image 503 stored in the memory 520 to the external electronic device 550.

The decompression module 551 of the external electronic device 550 may receive the small raw image 503. As set forth above, the small raw image 503 may be in a compressed state, and the decompression module 551 may decompress the small raw image 503 and deliver the same to the recognition module 552. The recognition module 552 may recognize the decompressed small raw image. For example, the recognition module 552 may perform segmentation on the small raw image and divide into at least one image area as a result of the segmentation. The recognition module 552 may perform recognition on the image area based on various recognition algorithms and obtain a result of the recognition. The recognition module 552 may classify image scenes and analyze the reliability for recognition information or image classification information. The result of recognition and at least one image area in the small raw image may be delivered, as correction area information, to the electronic device 500. According to an embodiment of the present disclosure, the correction area information may be configured in various fashions to include at least one of image area-associated information including at least one of location (or coordinate) information about the image area or the result of the recognition of the image area, image classification information, texture information, or reliability interference, which is described below in greater detail.

The ISP 512 may generate a corrected image 505 using the raw image 502 and the correction area information. The corrected image 505 may have, e.g., a YUV format. However, it would readily be appreciated by one of ordinary skill in the art that the format of the corrected image 505 is not limited thereto. The corrected image 505 may be stored in, e.g., a VRAM, and the corrected image 505 stored in the VRAM may be displayed on a display 530. The ISP 512 may transfer the corrected image 505 to the compression module 513. The compression module 513 may compress the corrected image 505 received, and may store the compressed image 504 in the memory 520. The compression module 513 may perform compression in a scheme defined by, e.g., the JPEG, but it would readily be appreciated by one of ordinary skill in the art that the compression scheme is not limited thereto.

According to an embodiment of the present disclosure, the external electronic device 550 may further include a processing circuit, such as an ISP (not shown). In this case, the external electronic device 550 may generate pixel adjustment information about at least one pixel in the small raw image 504 using the correction area information. The external electronic device 550 may generate the pixel adjustment information by an effect (e.g., tuning policy) corresponding to the correction area information. The external electronic device 550 may transfer the pixel adjustment information to the electronic device 500. Also, the ISP 512 may generate the corrected image 505 by applying the pixel adjustment information to the raw image 502. In this case, the ISP 512 may generate the corrected image 505 by adjusting at least one of the brightness, white-and-black, color, or color temperature of at least one pixel in the raw image 502 simply according to the pixel adjustment information.

Figure 6:
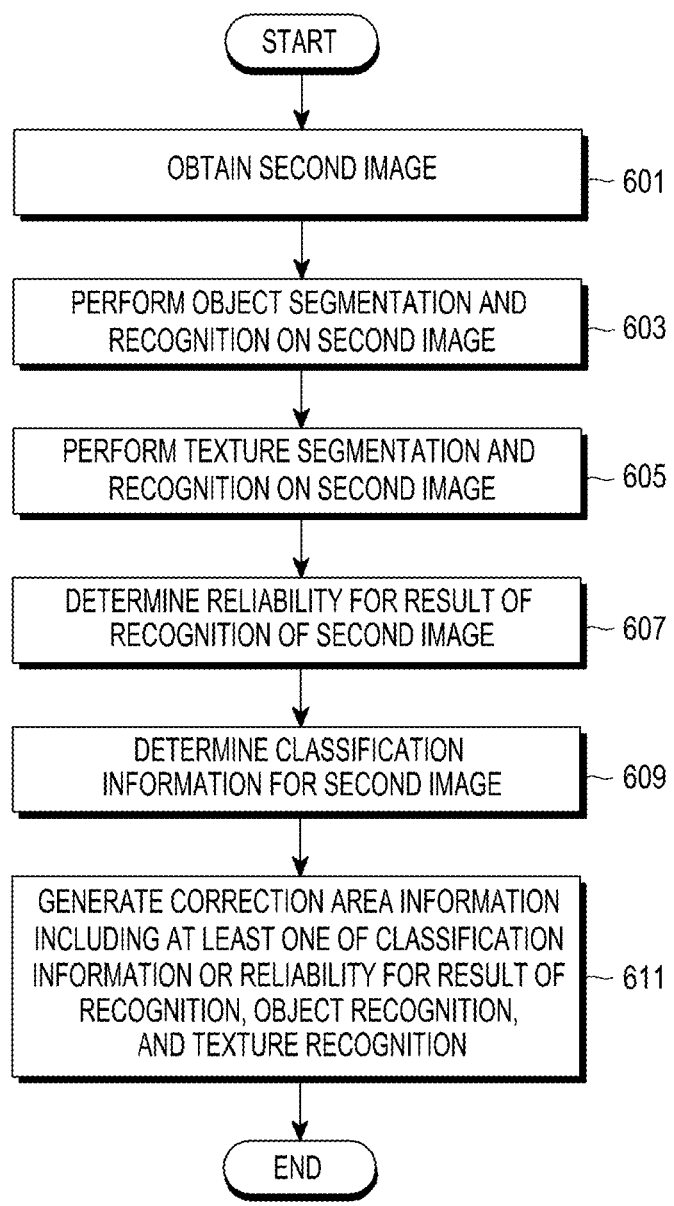
FIG. 6 illustrates a flowchart depicting the operations of an external electronic device according to an embodiment of the present disclosure.
Figure 7A:
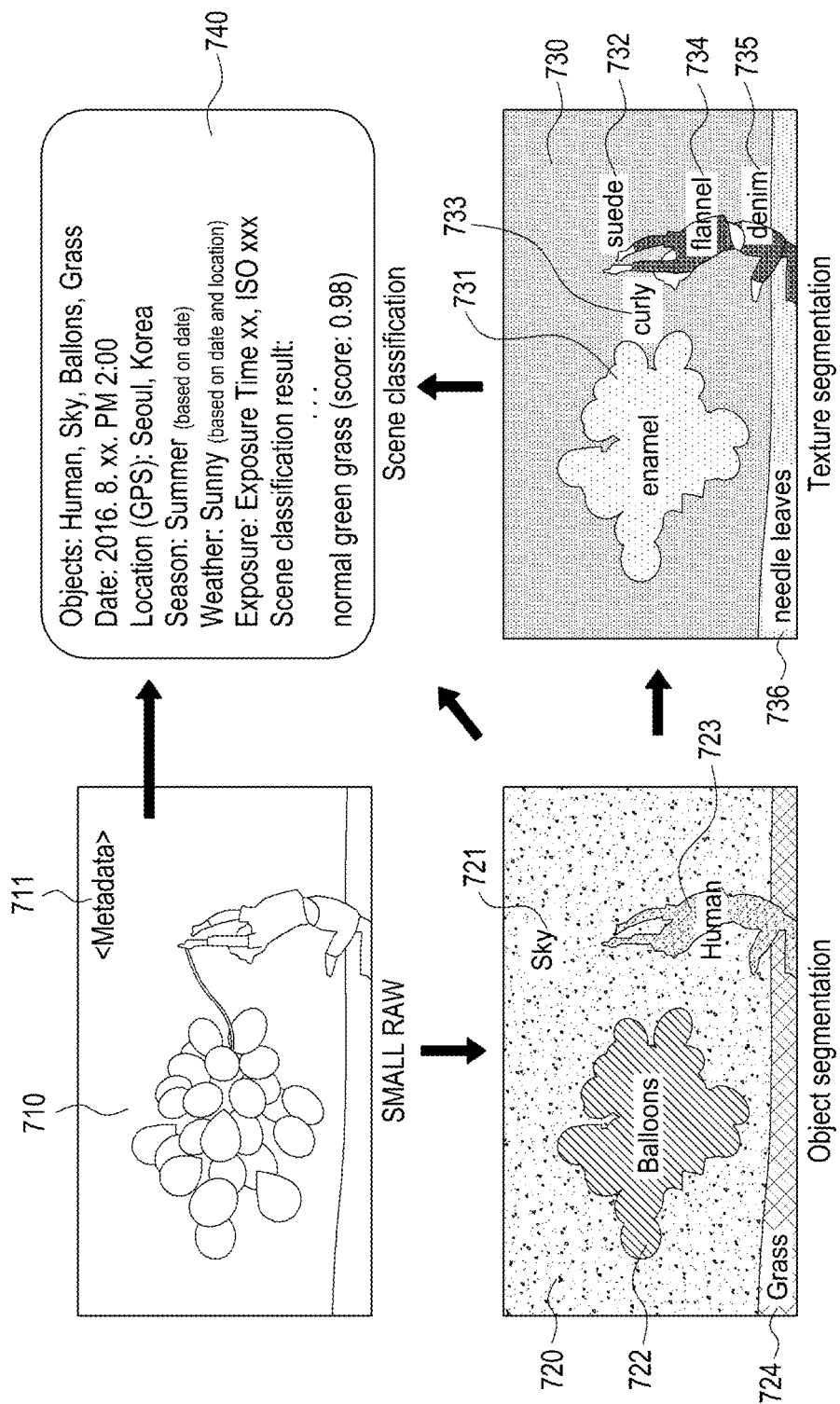
FIG. 7A illustrates a concept view of a process for generating correction area information according to an embodiment of the present disclosure.

FIG. 6 illustrates a flowchart depicting the operations of an external electronic device according to an embodiment of the present disclosure. The embodiment of FIG. 6 is described in greater detail with reference to FIG. 7A. FIG. 7A illustrates a concept view of a process for generating correction area information according to an embodiment of the present disclosure.

In operation 601, the external electronic device 400 (e.g., a processor of the external electronic device 400) may obtain a second image 710, as shown in, e.g., FIG. 7A, through, e.g., the communication interface or communication module of the external electronic device 400. The second image 710 may be an image down-scaled or down-sampled from a first image obtained through an image sensor in the electronic device 101. The external electronic device 400 (e.g., a processor of the external electronic device 400) may obtain the second image 710, which is a small raw image as shown in, e.g., FIG. 7A. The external electronic device 400 (e.g., a processor of the external electronic device 400) may additionally receive metadata 711 about the second image 710. The metadata 711 may include, e.g., the focal length, auto-focus area, information about left/right turn upon capturing (orientation), color coordinates (color space), exposure time, aperture-related information (F-number), capturing mode (exposure program) (e.g., auto, aperture priority, shutter priority, or manual), ISO speed ratings, or date captured (data time original). Or, although not shown, the metadata 711 may also include information obtained by a sensor other than the image sensor, such as the place captured or illuminance at time captured. The use of the metadata 711 is described below in further detail with reference to FIG. 9.

In operation 603, the external electronic device 400 (e.g., a processor of the external electronic device 400) may perform object segmentation and recognition on the second image 710. The term 'object' may mean an area into which the second image 710 is divided by segmentation, which may also be referred to as an image area. For example, the external electronic device 400 (e.g., a processor of the external electronic device 400) may obtain a segmentation map 720 as shown in FIG. 7A. The external electronic device 400 may divide the second image 710 into objects 721, 722, 723, and 724 based on various features, such as edge or blob. The external electronic device 400 (e.g., a processor of the external electronic device 400) may apply a recognition algorithm to each of the objects 721, 722, 723, and 724 and obtain a result of the recognition. For example, the external electronic device 400 (e.g., a processor of the external electronic device 400) may obtain the result of recognition of the objects 721, 722, 723, and 724 using a recognition algorithm obtained by applying machine learning or deep learning to a massive database. The external electronic device 400 (e.g., a processor of the external electronic device 400) may obtain the result of recognition that the first object 721 is a sky, the result of recognition that the second object 722 is balloons, the result of recognition that the third object 723 is a human, and the result of recognition that the fourth object 724 is a grass. The external electronic device 400 (e.g., a processor of the external electronic device 400) may obtain a segmentation map 720 including the results of recognition and location information (or pixel coordinate information) about the objects 721, 722, 723, and 724.

In operation 605, the external electronic device 400 (e.g., a processor of the external electronic device 400) may perform texture segmentation and recognition on the second image 710. The external electronic device 400 (e.g., a processor of the external electronic device 400) may obtain a texture segmentation map 730 as shown in FIG. 7A. The external electronic device 400 (e.g., a processor of the external electronic device 400) may perform texture recognition on, e.g., object-recognized objects 721, 722, 723, and 724, divide at least one of the objects 721, 722, 723, and 724 into portions, and obtain the result of texture recognition per portion. The term 'texture' may mean a particular pattern previously defined or a component that represents the texture. One object may include a plurality of textures. The texture recognition algorithm may also be obtained by applying machine learning or deep learning to a massive database. The external electronic device 400 (e.g., a processor of the external electronic device 400) may obtain a texture segmentation map 730 including the results of texture recognition and location information (or pixel coordinate information) about the plurality of objects 731 to 736.

In operation 607, the external electronic device 400 (e.g., a processor of the external electronic device 400) may determine the reliability for the results of recognition of the second image 710. The external electronic device 400 (e.g., a processor of the external electronic device 400) may determine at least one of the reliability for the results of texture recognition or the reliability for the results of object recognition.

In operation 609, the external electronic device 400 (e.g., a processor of the external electronic device 400) may determine classification information about the second image 710. The external electronic device 400 (e.g., a processor of the external electronic device 400) may obtain, e.g., classification information 740 as shown in FIG. 7A. The classification information 740 may be information indicating what content the second image 710 is overall about. The external electronic device 400 (e.g., a processor of the external electronic device 400) may obtain the classification information 740 by applying an image classification algorithm to the second image 710. The external electronic device 400 (e.g., a processor of the external electronic device 400) may obtain the classification information 740 using at least one of the results of object recognition or the results of texture recognition. The external electronic device 400 (e.g., a processor of the external electronic device 400) may directly obtain the classification information 740 from the second image 710. The classification information 740 may include, e.g., whole image recognition result (scene classification result) information indicating a normal green grass. The classification information 740 may include, e.g., object information (e.g., sky, balloons, or grass), date information (e.g., 2:00, Aug. xx, 2016), place information (e.g., Seoul, Korea), season information (e.g., summer), weather information (e.g., sunny), or exposure-related information (e.g., exposure time xx, ISO xxx). The external electronic device 400 (e.g., a processor of the external electronic device 400) may also obtain the classification information 740 using the metadata and the results of applying the recognition algorithm.

Figure 7B:
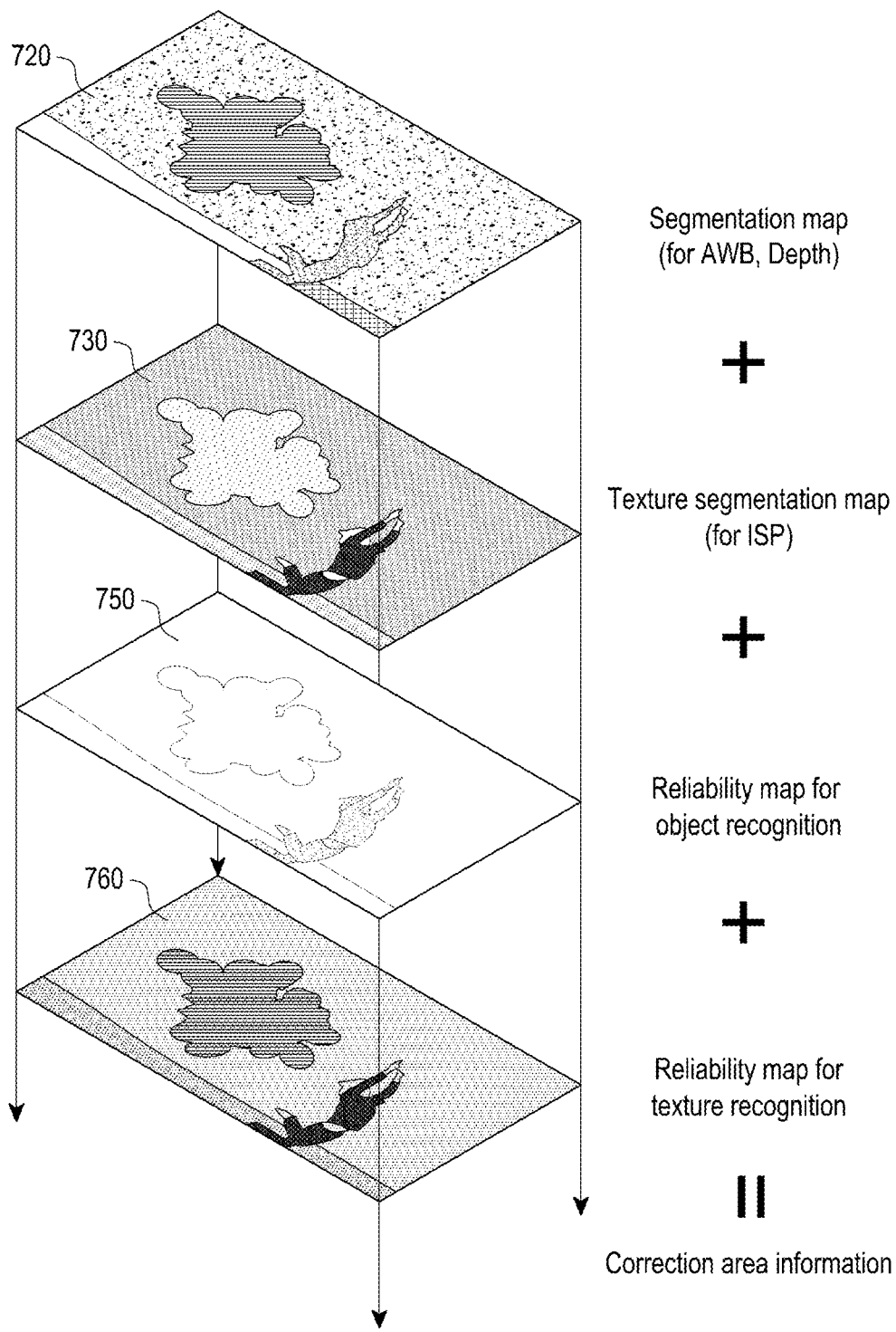
FIG. 7B illustrates a concept view depicting the correction area information according to an embodiment of the present disclosure.

In operation 611, the external electronic device 400 (e.g., a processor of the external electronic device 400) may generate correction area information including at least one of the results for object recognition, texture recognition, and recognition, or classification information. For example, as shown in FIG. 7B, the external electronic device 400 (e.g., a processor of the external electronic device 400) may generate correction area information constituted of multiple layers. The correction area information constituted of a plurality of layers may include a segmentation map 720, a texture segmentation map 730, a map 750 indicating the reliability for object recognition, and a map 760 indicating the reliability for texture recognition. The coordinates of the respective pixels of the plurality of maps 720, 730, 750, and 760 may be the same and may correspond to the pixels of the raw image. Accordingly, a plurality of pieces of information (e.g., object attribute, texture attribute, accuracy of object attribute, and accuracy of texture attribute) may correspond to one pixel in the raw image. The external electronic device 400 (e.g., a processor of the external electronic device 400) may send the correction area information constituted of a plurality of layers to the electronic device 101. The electronic device 101 may perform correction by applying the correction area information to the raw image. For example, the electronic device 101 (e.g., the processor 120 or 210) may apply an effect corresponding to a balloon to the pixels of the raw image corresponding to the pixel coordinates of the balloon object of the segmentation map 720. The electronic device 101 (e.g., the processor 120 or 210) may apply an effect corresponding to enamel to the pixels of the raw image corresponding to the pixel coordinates of the enamel texture object of the texture segmentation map 730. The electronic device 101 (e.g., the processor 120 or 210) may adjust the degree of an effect applied, considering the reliability of object recognition or the reliability of texture recognition. The electronic device 101 (e.g., the processor 120 or 210) may apply an effect corresponding to an outdoor environment to the overall raw image based on the results of image classification (e.g., a common green grass). The multi-layered configuration shown in FIG. 7B is merely an example. The correction area information may be implemented as one-dimensional text information, and the type of data representing the correction area information is not limited. Some of the plurality of layers of FIG. 7B may be missed, or another map may be added.

According to an embodiment of the present disclosure, the external electronic device 400 (e.g., a processor of the external electronic device 400) may obtain pixel adjustment information about the second image based on correction area information generated as set forth above in connection with FIGS. 6, 7A, and 7B. The external electronic device 400 (e.g., a processor of the external electronic device 400) may transmit the pixel adjustment information through, e.g., the communication interface or communication module of the external electronic device 400 to the electronic device 101. The electronic device 101 (e.g., the processor 120 or 210) may generate a corrected image by adjusting at least one of the brightness, white-and-black, color, or color temperature of at least one pixel in the first image simply as per the pixel adjustment information.

Figure 8:
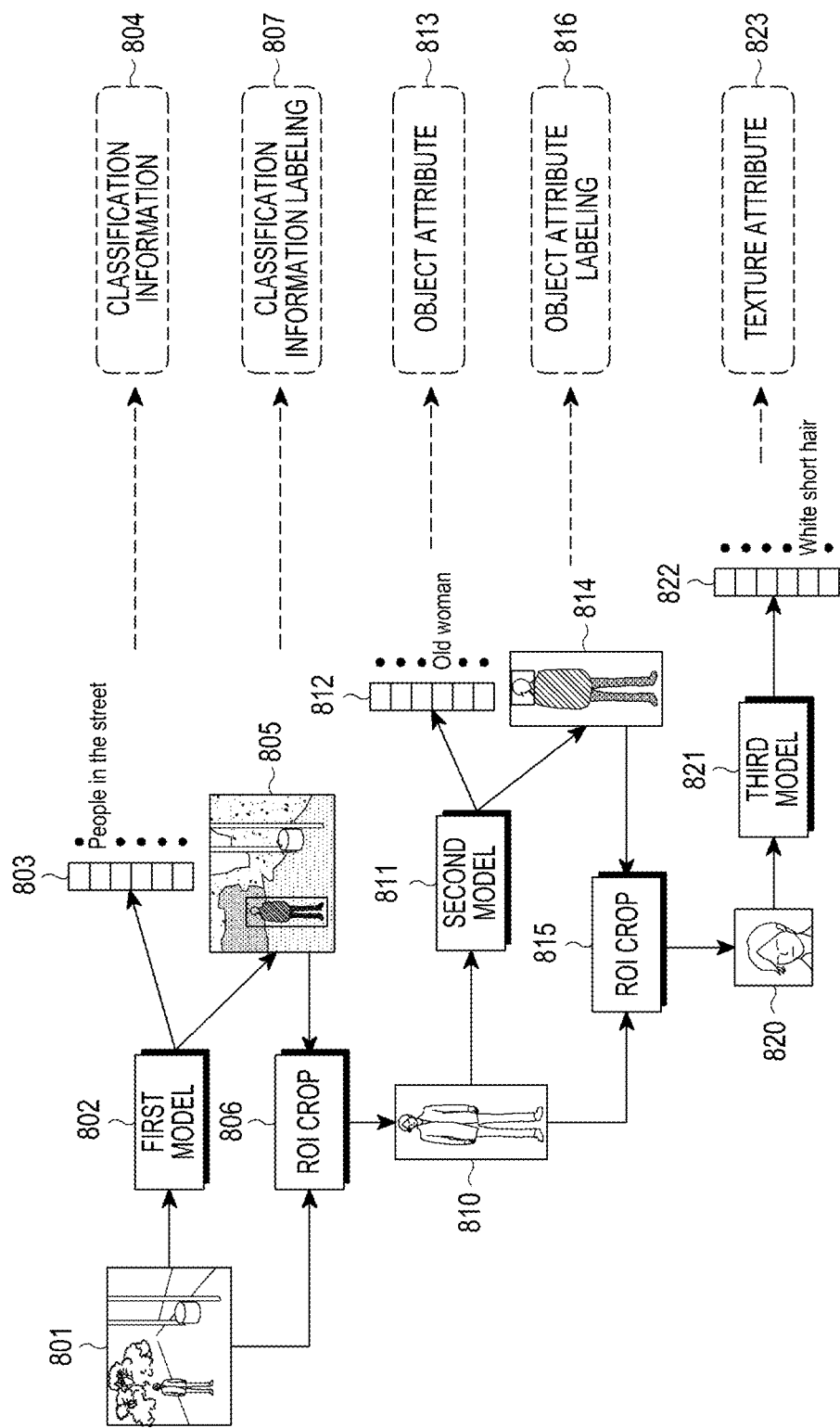
FIG. 8 illustrates a concept view depicting an example of generating correction area information according to an embodiment of the present disclosure.

FIG. 8 illustrates a concept view depicting an example of generating correction area information according to an embodiment of the present disclosure.

According to an embodiment of the present disclosure, the external electronic device 400 (e.g., a processor of the external electronic device 400) may receive a small raw image 801 from the electronic device 101 through, e.g., the communication interface or communication module of the external electronic device 400. The external electronic device 400 (e.g., a processor of the external electronic device 400) may previously store a plurality of recognition models 802, 811, and 821. Thus, the recognition models may mutually compensate for problems, enabling simultaneously obtaining various pieces of information. The external electronic device 400 (e.g., a processor of the external electronic device 400) may apply a first recognition model 802 to the small raw image 801. The first recognition model 802 may be a recognition model that determines at least one of a region of interest (ROI) or classification information of an image. By the results of applying the first recognition model 802 to the small raw image 801, the "People in the street" classification information 804 among the plurality of pieces of classification information 803 may be selected. In other words, the classification information of the overall small raw image 801 may be determined as "People in the street." The external electronic device 400 (e.g., a processor of the external electronic device 400) may label (807) the small raw image 801 with the classification information 804. For example, the first recognition model 802 may select the classification information 804 using, e.g., an overall color distribution and relative relationship in the location of the color area in which case the classification information 804 may be obtained even without performing recognition on particular objects in the small raw image 801. For example, the first recognition model 802 may detect that a color similar to the representative color of the street is distributed over the overall screen and that a color similar to the representative color of the people extending up and down in a portion of the area where the representative color of the street is distributed, thus able to determine that the corresponding image has the classification information 804 of "people in the street." What has been described above is merely an example, and according to an embodiment of the present disclosure, the first recognition model 802 may include various algorithms for obtaining classification information. According to an embodiment of the present disclosure, the external electronic device 400 (e.g., a processor of the external electronic device 400) may obtain the classification information of the small raw image 801 using at least one of the result of object recognition or the result of texture recognition. In other words, applying the first recognition model 802 is not limited to a particular order. The first recognition model 802 may detect an ROI 810 from the small raw image 801 based on various types of ROI detection schemes.

According to an embodiment of the present disclosure, the external electronic device 400 (e.g., a processor of the external electronic device 400) may crop (806) the ROI 810 from the segmentation result 805 and apply the second recognition model 811 to the ROI 810 cropped (806). The second recognition model 811 may determine at least one of the ROI or object recognition and recognize an object inside the ROI 810. Accordingly, the object attribute 813 may be recognized by the second recognition model 811 as "old woman" among the plurality of object attributes 812. The second recognition model 811 may include a recognition algorithm for each of the plurality of object attributes 812. The external electronic device 400 may label (816) the ROI 810 with the object attribute 813. For example, the external electronic device 400 may label the ROI 810 with the object attribute 813, "old woman."

According to an embodiment of the present disclosure, the second recognition model 811 may determine a result 814 of texture segmentation from the ROI 810 and determine another ROI 820 from the result of texture segmentation. The external electronic device 400 may crop (815) the other ROI 820. The external electronic device 400 may apply the third recognition model 821 to the other ROI 820. The third recognition model 821 may perform texture recognition. The third recognition model 821 may determine that the texture attribute 823 for the other ROI 820 is "white short hair" among the plurality of texture attributes 822. The third recognition model 821 may include a texture recognition algorithm for each of the plurality of texture attributes 822. According to an embodiment of the present disclosure, despite a failure to recognize by the second recognition model 811, texture segmentation and texture recognition may be performed on at least part of the ROI 810 by the third recognition model 821. According to an embodiment of the present disclosure, the third recognition model 811 may directly receive the ROI 810, not the other ROI 820, from the first recognition model 802. The third recognition model 811 may perform texture segmentation and texture recognition on the whole small raw image 801. The plurality of models 802, 811, and 821 may perform recognition independently, but not dependently. For example, even where the classification information 804 is not obtained from the first recognition model 802, the second recognition model 811 may perform object recognition on the small raw image 801.

The external electronic device 400 (e.g., a processor of the external electronic device 400) may transmit correction area information including at least one of the classification information 804, the object attribute 813, or the texture attribute 823, to the electronic device 101 through, e.g., the communication interface or communication module of the external electronic device 400. For example, the external electronic device 400 (e.g., a processor of the external electronic device 400) may include, in the correction area information, accuracy information about at least one of the classification information 804, the object attribute 813, or the texture attribute 823, and transmit to the electronic device 101 through, e.g., the communication interface or communication module of the external electronic device 400. The electronic device 101 (e.g., the processor 120 or 210) may apply an effect corresponding to the correction area information to the raw image, thus able to generate an image quality-enhanced image. For example, the electronic device 101 (e.g., the processor 120 or 210) may process a raw image portion corresponding to the ROI 810 with an effect (e.g., increase brightness) corresponding to "old woman." For example, the electronic device 101 (e.g., the processor 120 or 210) may process a raw image portion corresponding to the other ROI 820 with an effect (e.g, sharpening and whitening) corresponding to "white short hair." For example, the electronic device 101 may process the whole raw image with an effect corresponding to the outdoor environment based on the classification information 804 of "people in the street."

According to an embodiment of the present disclosure, the external electronic device 400 (e.g., a processor of the external electronic device 400) may update at least one of the first recognition model 802, the second recognition model 811, or the third recognition model 821, and may add another recognition model. The external electronic device 400 (e.g., a processor of the external electronic device 400) may generate correction area information using the plurality of recognition models updated and transmit the correction area information to the electronic device 101. Although the ISP of the electronic device 101 is not exchanged or updated, the electronic device 101 (e.g., the processor 120 or 210) may generate an image quality-enhanced image based on the updated recognition model.

According to an embodiment of the present disclosure, the external electronic device 400 (e.g., a processor of the external electronic device 400) may obtain pixel adjustment information about the small raw image based on correction area information generated as set forth above in connection with FIG. 8. The external electronic device 400 (e.g., a processor of the external electronic device 400) may transmit the pixel adjustment information through, e.g., the communication interface or communication module of the external electronic device 400 to the electronic device 101. The electronic device 101 (e.g., the processor 120 or 210) may generate a corrected image by adjusting at least one of the brightness, white-and-black, color, or color temperature of at least one pixel in the raw image simply as per the pixel adjustment information.

Figure 9:
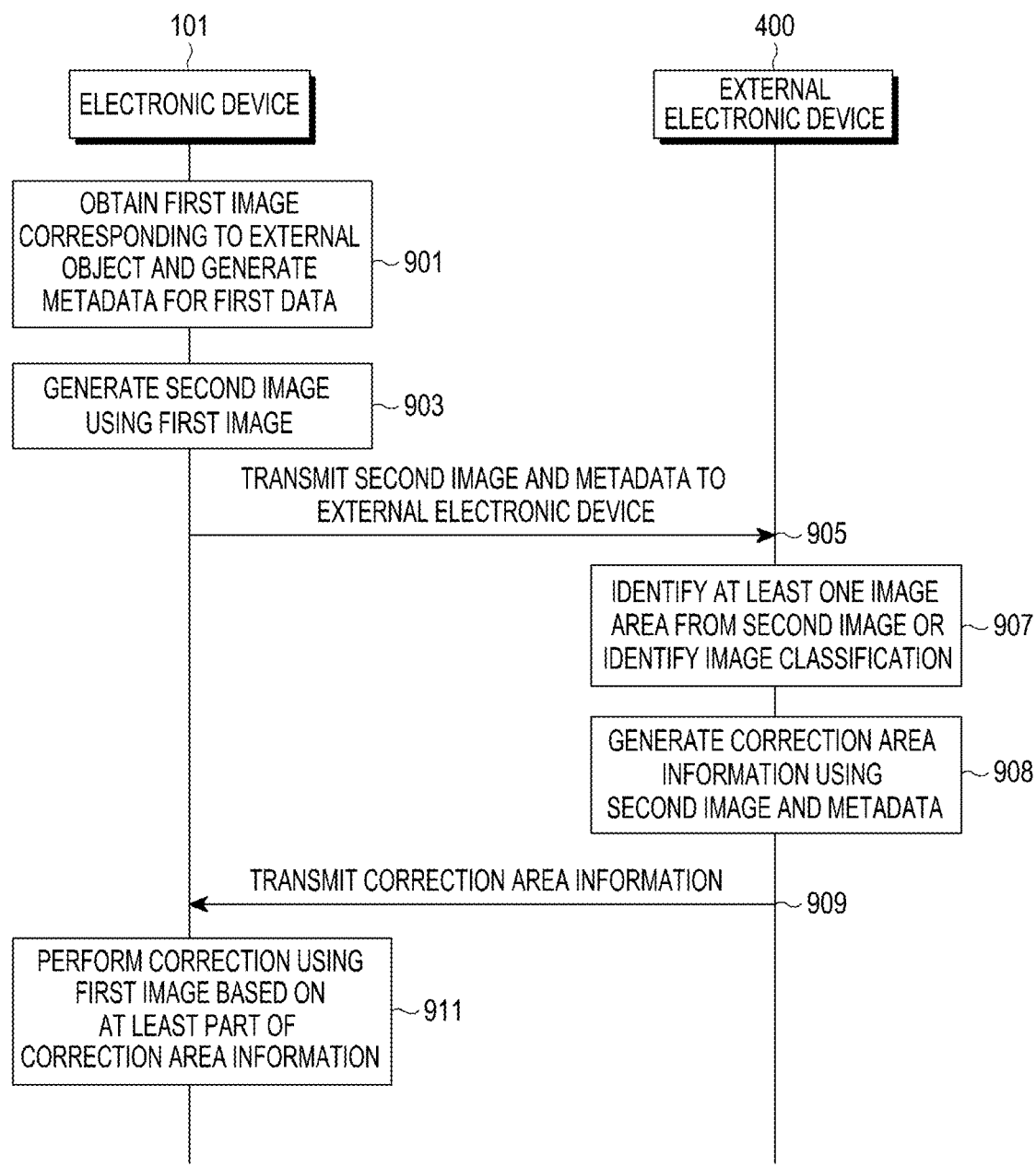
FIG. 9 illustrates a flowchart depicting the operations of an electronic device and an external electronic device according to an embodiment of the present disclosure.

FIG. 9 illustrates a flowchart depicting the operations of an electronic device and an external electronic device according to an embodiment of the present disclosure.

According to an embodiment of the present disclosure, the electronic device 101 (e.g., the processor 120 or 210) may obtain a first image corresponding to an external object through an image sensor, using, e.g., the camera module 291 in operation 901. The electronic device 101 (e.g., the processor 120 or 210) may generate metadata for the first image. As described above, the metadata may include information, such as a focal length, auto-focus area, left/right turn-related information upon capturing (orientation), color coordinates (color space), or exposure time, which may be obtained through the image sensor. The metadata may also include, e.g., place information about where the image has been captured, which may be obtained through a sensor (e.g., a GPS sensor) different from the image sensor. For example, the metadata may include the information indicating that the first image has been captured in Seoul at 09:30, Mar. 24, 2017. In operation 903, the electronic device 101 (e.g., the processor 120 or 210) may generate a second image, which is smaller in data size than the first image, using the first image. For example, the electronic device 101 (e.g., the processor 120 or 210) may down-scale or down-sample the first image, generating a second image that is smaller in size than the first image. In operation 905, the electronic device 101 (e.g., the processor 120 or 210) may transmit the second image and metadata through, e.g., the communication interface 170 or communication module 220, to the external electronic device 400 so that the external electronic device 400 generates correction area information based on at least one of classification information or a plurality of image areas identified from the second image.

According to an embodiment of the present disclosure, the external electronic device 400 (e.g., a processor of the external electronic device 400) may identify at least one image area or image classification through, e.g., segmentation or recognition, from the second image in operation 907. In operation 908, the external electronic device 400 (e.g., a processor of the external electronic device 400) may generate the correction area information using the second image and metadata. The external electronic device 400 (e.g., a processor of the external electronic device 400) may generate the correction area information including recognition information indicating, e.g., that a sky is positioned in the first area, from the second image. The external electronic device 400 (e.g., a processor of the external electronic device 400) may access a server providing weather information and obtain weather information (e.g., cloudy) about Seoul at 09:30, Mar. 24, 2017. The external electronic device 400 (e.g., a processor of the external electronic device 400) may generate the correction area information indicating that the object attribute of the first area of the second image is "cloudy sky." In operation 909, the external electronic device 400 (e.g., a processor of the external electronic device 400) may transmit the correction area information to the electronic device 101 through, e.g., a communication interface or communication module of the external electronic device 400. In operation 911, the electronic device 101 (e.g., the processor 120 or 210) may generate a third image as corrected, using the first image based on at least part of the correction area information. Accordingly, the third image may be generated by processing the first area of the first image with an effect corresponding to "cloudy sky."

According to an embodiment of the present disclosure, the external electronic device 400 (e.g., a processor of the external electronic device 400) may obtain pixel adjustment information about the second image based on the correction area information generated even using the metadata. The external electronic device 400 (e.g., a processor of the external electronic device 400) may transmit the pixel adjustment information through, e.g., the communication interface or communication module of the external electronic device 400 to the electronic device 101. The electronic device 101 (e.g., the processor 120 or 210) may generate a corrected image by adjusting at least one of the brightness, white-and-black, color, or color temperature of at least one pixel in the first image simply as per the pixel adjustment information.

Figure 10:
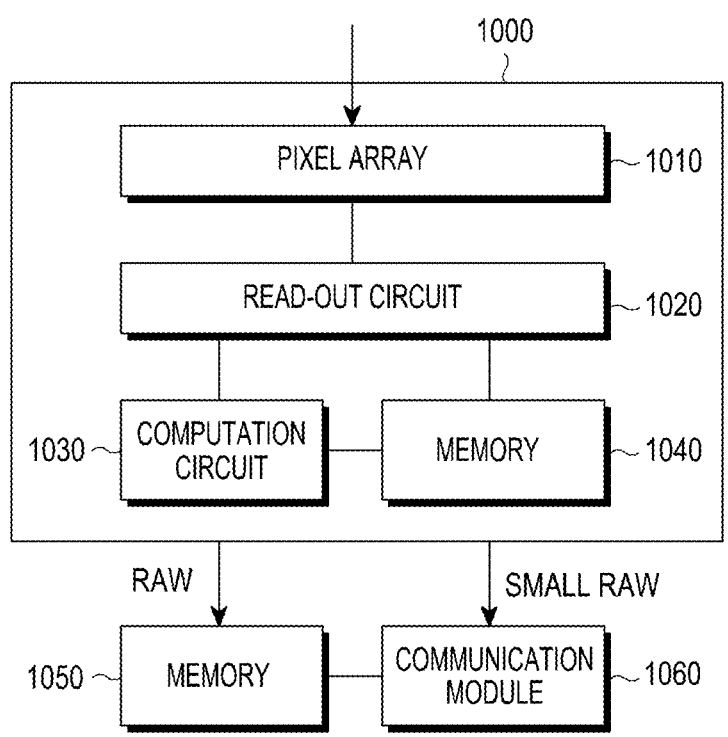
FIG. 10 illustrates a block diagram of an image sensor according to an embodiment of the present disclosure.

FIG. 10 illustrates a block diagram of an image sensor according to an embodiment of the present disclosure.

Referring to FIG. 10, an image sensor 1000 of an electronic device may include a pixel array 1010, a read-out circuit 1020, a computation circuit 1030, and a memory 1040. The pixel array 1010 may include a plurality of photo diodes arrayed in two-dimension (2D). Each of the plurality of photo diodes may convert light received from the outside into an analog electrical signal. The read-out circuit 1020 may include, e.g., a row-driver and a column-driver. The row-driver may drive the pixel array 1010 per row. For example, the row-driver may output transmission control signals to control the transmission transistors of the plurality of pixels in the pixel array 1010, reset control signals to control reset transistors, or selection control signals to control selection transistors to the pixel array 1010. The row-driver may determine a row to be read out. The column-driver may receive analog electrical signals generated by the pixel array 1010. For example, the column-driver may receive an analog electrical signal from a column line selected from among the plurality of columns constituting the pixel array 1010. The column-driver may include an analog-digital converter (ADC) that may convert the analog electrical signal received from the selected column line into pixel data (or a digital signal) and output the pixel data. Meanwhile, the operations that the column-driver receives an analog electrical signal from the pixel array 1010, converts the received analog electrical signal into pixel data using the ADC, and outputs the pixel data may be referred to as 'read out.' The column-driver and the ADC may determine a column to be read out. A 2D raw image may be read out by the read-out circuit 1020.

According to an embodiment of the present disclosure, the memory 1040 may store electrical signals output from the read-out circuit 1020. The electrical signals each of which is output from a respective one of the plurality of photo diodes may be stored, as a 2D raw image, in the memory 1040. Alternatively, rather than stored in the memory 1040, the raw image may directly be stored in a memory 1050 of the electronic device 101 which is placed outside the image sensor 1000. According to an embodiment of the present disclosure, the computation circuit 1030 may generate a small raw image using the raw image stored in the memory 1040. The computation circuit 1030 may be configured to down-scale or down-sample the raw image stored in the memory 1040. The computation circuit 1030 may be implemented in a processing unit, e.g., a central processing unit (CPU) or graphics processing unit (GPU) or in a relatively simple circuit, such as a logic gate array. According to an embodiment of the present disclosure, the computation circuit 1030 may directly receive the raw image from the read-out circuit 1020, generate a small raw image using the received raw image, and store in the small raw image in the memory 1040 or output to the external memory 1050. The computation circuit 1030 may directly output the generated small raw image to the communication module 1060. The communication module 1060 of the electronic device 101 may send the small raw image generated from the image sensor 1000 to the external electronic device 400 as described above. As set forth above, in the electronic device 101 according to an embodiment of the present disclosure, a processor (e.g., the processor 120 or 210) disposed outside the image sensor 1000 may generate the small raw image, or as described above in connection with FIG. 10, the image sensor 1000 itself may generate the small raw image.

Figure 11A:
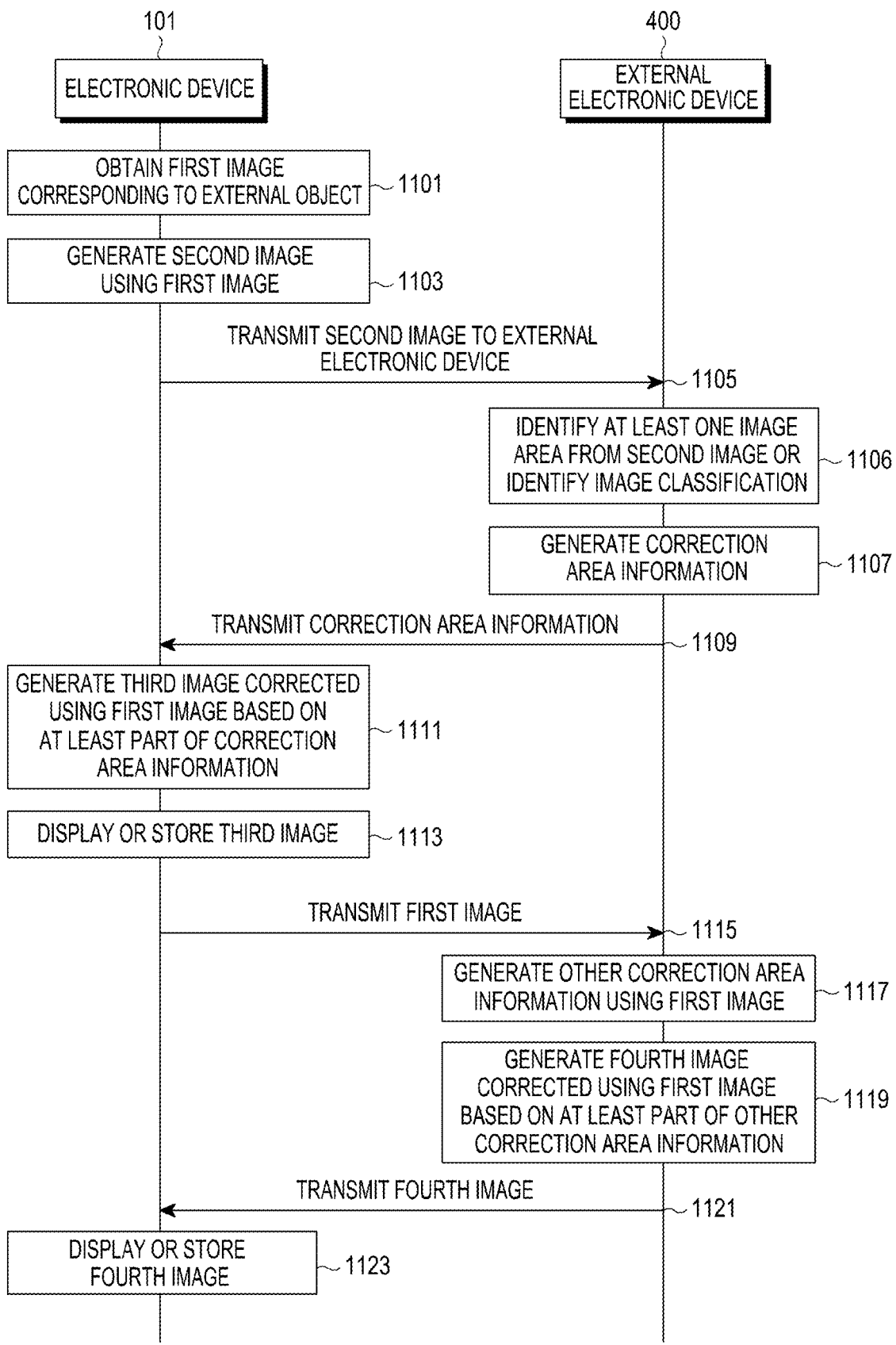
FIGS. 11A and 11B illustrate flowcharts depicting a method for operating an electronic device and an external electronic device according to an embodiment of the present disclosure.
Figure 11B:
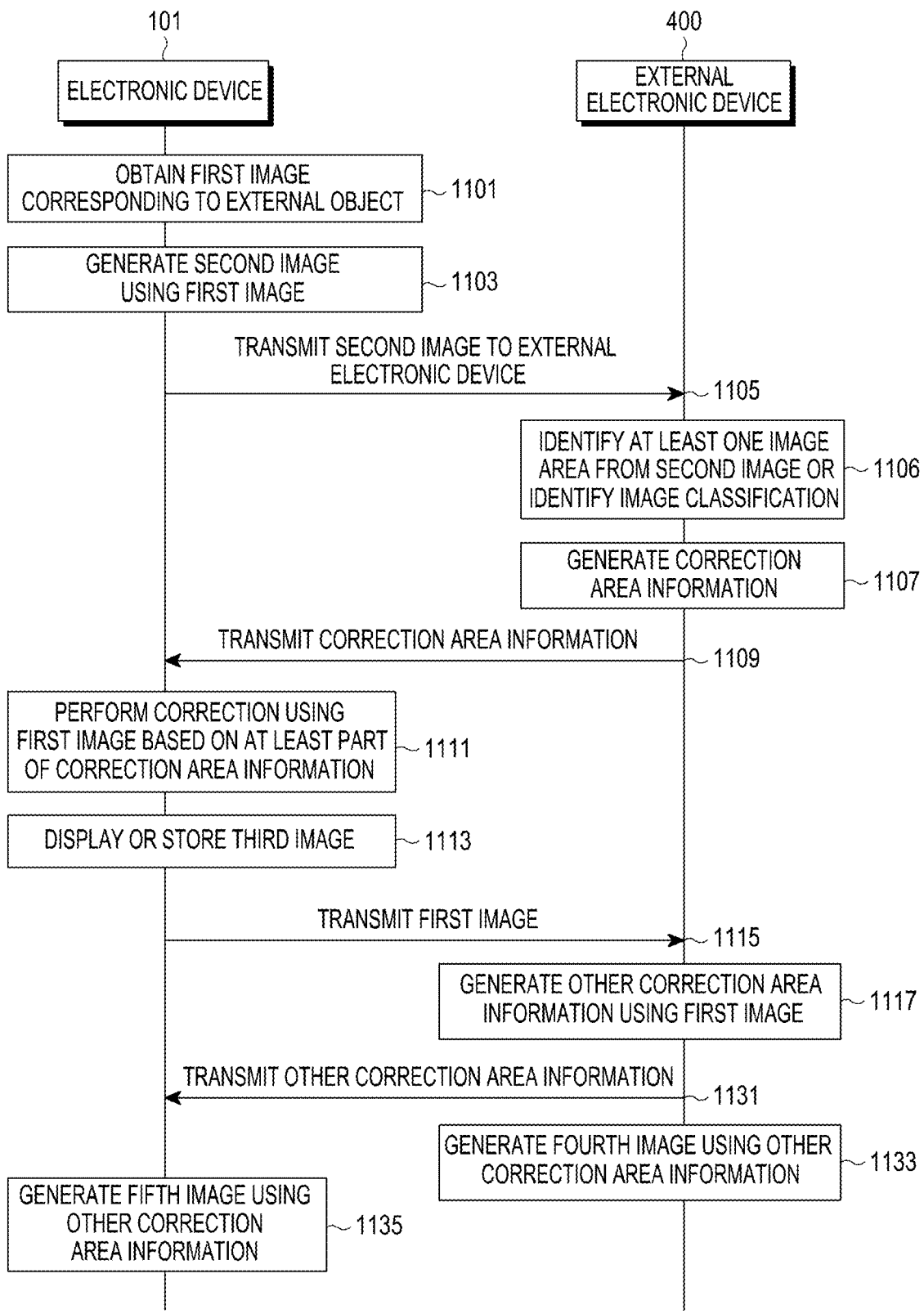

FIGS. 11A and 11B illustrate flowcharts depicting a method for operating an electronic device and an external electronic device according to an embodiment of the present disclosure.

Referring to FIG. 11A, according to an embodiment of the present disclosure, the electronic device 101 (e.g., the processor 120 or 210) may obtain a first image corresponding to an external object, using, e.g., the camera module 291 in operation 1101. In operation 1103, the electronic device 101 (e.g., the processor 120 or 210) may generate a second image, which is smaller in data size than the first image, using the first image. In operation 1105, the electronic device 101 (e.g., the processor 120 or 210) may transmit the second image through, e.g., the communication interface 170 or communication module 220, to the external electronic device 400 so that the external electronic device 400 generates correction area information based on at least one of classification information or information related to a plurality of image areas identified from the second image. The external electronic device 400 (e.g., a processor of the external electronic device 400) may identify at least one image area or image classification from the second image in operation 1106. In operation 1107, the external electronic device 400 (e.g., a processor of the external electronic device 400) may generate the correction area information. In operation 1109, the external electronic device 400 (e.g., a processor of the external electronic device 400) may transmit the correction area information to the electronic device 101 through, e.g., a communication interface or communication module of the external electronic device 400. In operation 1111, the electronic device 101 (e.g., the processor 120 or 210) may perform correction using the first image based on at least part of the correction area information and thus generate a third image as corrected. In operation 1113, the electronic device 101 (e.g., the processor 120 or 210) may perform control to display or store the third image.

In operation 1115, the electronic device 101 (e.g., the processor 120 or 210) may transmit the first image through, e.g., the communication interface 170 or communication module 220. Although FIG. 11A illustrates the example in which the first image is transmitted after the third image is displayed or stored, this is merely an example. After transmitting the second image in operation 1105, the electronic device 101 (e.g., the processor 120 or 210) may send the first image at any time through, e.g., the communication interface 170 or communication module 220. Since the first image is larger in size than the second image as described above, the electronic device 101 (e.g., the processor 120 or 210) may first transmit the second image through, e.g., the communication interface 170 or communication module 220 so as to quickly obtain correction area information, and at any time after the transmission is complete, the electronic device 101 (e.g., the processor 120 or 210) may transmit the first image through, e.g., the communication interface 170 or communication module 220.

According to an embodiment of the present disclosure, the electronic device 101 (e.g., the processor 120 or 210) may generate other correction area information using the first image in operation 1117. By using the first image larger in size than the second image, the external electronic device 400 (e.g., a processor of the external electronic device 400) may generate correction area information different from the correction area information obtained using the second image, wherein the different correction area information may be termed 'expanded correction area information.' Since the first image may contain more information than the second image, the external electronic device 400 may generate more detailed correction area information. According to an embodiment of the present disclosure, the external electronic device 400 (e.g., a processor of the external electronic device 400) may directly generate the expanded correction area information from the first image. Alternatively, the external electronic device 400 (e.g., a processor of the external electronic device 400) may generate the expanded correction area information using the first image and the existing correction area information generated using the second image. In operation 1119, the external electronic device 400 (e.g., a processor of the external electronic device 400) may generate a fourth image, which is a corrected image, using the first image based on at least part of the different correction area information, i.e., the expanded correction area information. In operation 1121, the external electronic device 400 (e.g., a processor of the external electronic device 400) may transmit the fourth image to the electronic device 101 through, e.g., a communication interface or communication module of the external electronic device 400. Since the fourth image is an image obtained by correcting the first image, which is the raw image, using the expanded correction area information, the fourth image may be an ultra high-resolution image. The external electronic device 400 (e.g., a processor of the external electronic device 400) may transmit the fourth image through, e.g., the communication interface or communication module of the external electronic device 400, upon receiving a request to download from the electronic device 101, being in a Wi-Fi communication-enabled state, or receiving a sync request. In operation 1123, the electronic device 101 (e.g., the processor 120 or 210) may perform control to display or store the fourth image. The electronic device 101 (e.g., the processor 120 or 210) may store the fourth image and fourth image together or exchange the third image with the fourth image and store it.

FIG. 11B is a flowchart illustrating a method for operating an electronic device and an external electronic device according to an embodiment of the present disclosure. Operations 1101 to 1117 of FIG. 11B have been described above in connection with FIG. 11A, and no further detailed description thereof is given.

In operation 1131, the external electronic device 400 (e.g., a processor of the external electronic device 400) may transmit the different correction area information to the electronic device 101 through, e.g., a communication interface or communication module of the external electronic device 400. In operation 1133, the external electronic device 400 (e.g., a processor of the external electronic device 400) may perform correction using the different correction area information, generating the fourth image. In operation 1135, the electronic device 101 (e.g., the processor 120 or 210) may generate a fifth image from the first image using the different correction area information, i.e., the expanded correction area information. The electronic device 101 (e.g., the processor 120 or 210) may store the third image together with the fifth image, or may exchange the third image with the fifth image and store it.

Figure 12:
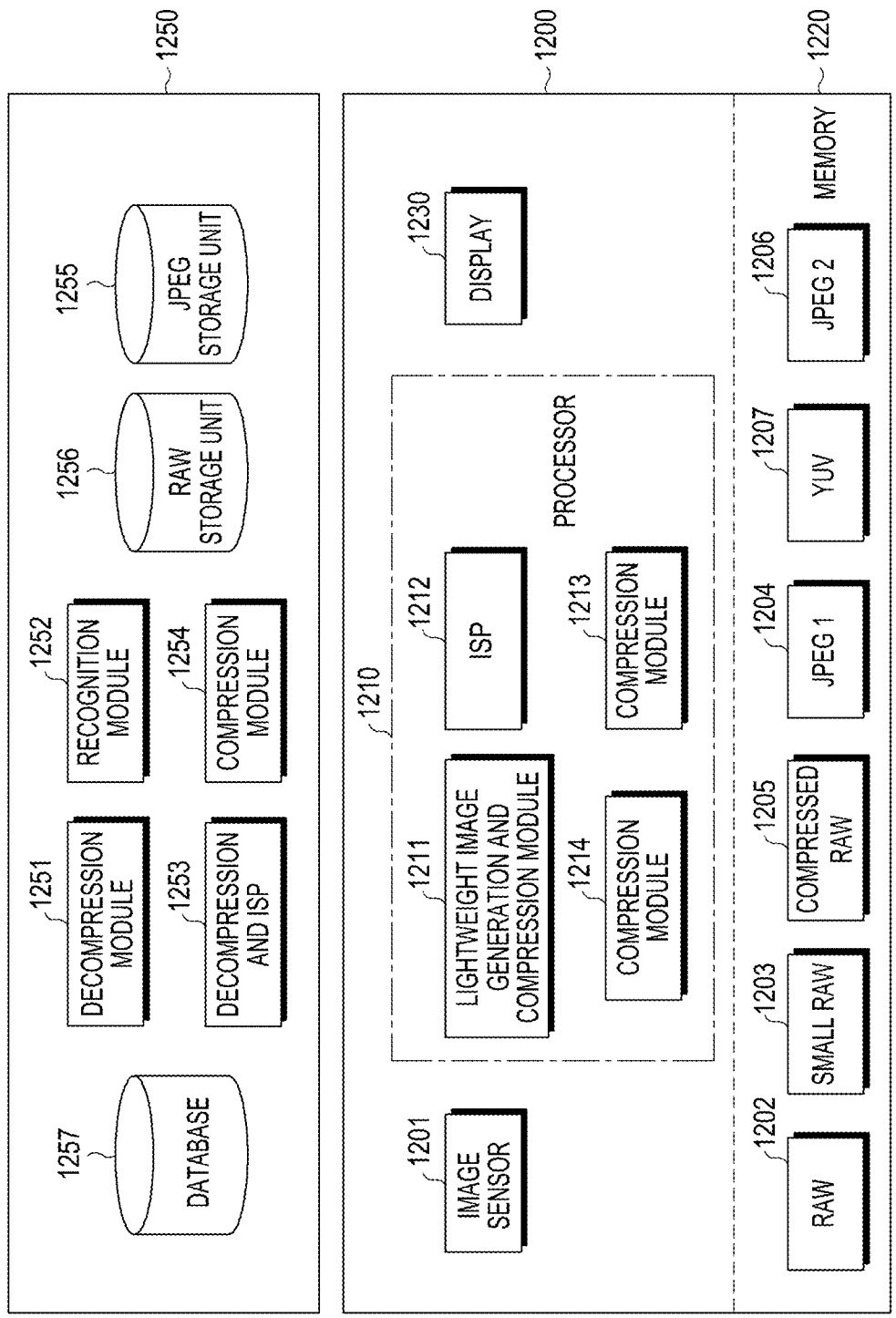
FIG. 12 illustrates a block diagram of an electronic device and an external electronic device according to an embodiment of the present disclosure.

FIG. 12 illustrates a block diagram of an electronic device and an external electronic device according to an embodiment of the present disclosure.

According to an embodiment of the present disclosure, an electronic device 1200 (e.g., the electronic device 101) may include an image sensor 1201, a processor 1210, a memory 1220, and a display 1230. The image sensor 1201 may generate a raw image 1202 and store the raw image 1202 in the memory 1220. The lightweight image generation and compression module 1211 may generate a lightweight image, i.e., a small raw image 1203, using the raw image 1202 and compress the small raw image 1203. The compressed small raw image 1203 may be stored in the memory 1220. A communication module (not shown) of the electronic device 1200 may transmit the small raw image 1203 to a communication module (not shown) of an external electronic device 1250. A decompression module 1251 may receive and decompress the compressed small raw image 1203. A recognition module 1252 may generate correction area information using the decompressed small raw image. The correction area information may be sent to an ISP 1212 of the electronic device 1200 via the communication modules. The ISP 1212 may generate a corrected image 1207 using the correction area information and the raw image 1202. The corrected image 1207 may be in a YUV format, but this is merely an example, and the format of the corrected image 1207 is not limited thereto. The corrected image 1207 may be stored in the memory 1220, e.g., a VRAM, so that the corrected image 1207 may be displayed on the display 1230. The ISP 1212 may transfer the corrected image 1207 to the compression module 1213. The compression module 1213 may compress the corrected image into a compressed image 1204 and store the compressed image 1204 in the memory 1220.

The compression module 1214 may compress the raw image 1202 and store the compressed raw image 1205 in the memory 1220. The compressed raw image 1205 may be stored via the communication modules in a raw image storage unit of the external electronic device 1250. According to an embodiment of the present disclosure, the electronic device 1200 may send the raw image 1202 to the external electronic device 1250 without compressing the raw image 1202. A database 1257 stored in the raw image storage unit 1256 may include the raw image. The database 1257 may further include a feature vector that may be used for correction by a compression and ISP 1253 of the external electronic device 1250. For example, the decompression and ISP 1253 may receive the feature vector from the database 1257 and synthesize it with the decompressed raw image using segmentation information, generating an ultra high-quality image. Further, the decompression and ISP 1253 may enhance image quality by applying a pre-defined tuning policy (e.g., an effect) corresponding to the classification information about the image according to the segmentation information. The feature vector may be a portion of an object in an image, such as of human hair, or a whole object, e.g., a human face or leaf, and the feature vector may contain, e.g., a texture patch or vector font. The decompression and ISP 1253 may apply a pre-defined tuning policy corresponding to the category of the correction area information according to the segmentation information or the existing correction area information generated based on the raw image. The decompression and ISP 1253, upon failure to receive the feature vector, may render a feature vector based on the category information.

According to an embodiment of the present disclosure, the compressed raw image 1205 may be decompressed and contained in the database 1257. The raw image contained in the database 1257 may be delivered to the recognition module 1252 and the decompression and ISP 1253. The recognition module 1252 may perform recognition on the raw image. The recognition module 1252 may generate expanded correction area information as a result of the recognition on the raw image. The recognition module 1252 may obtain the expanded correction area information from the raw image or generate the expanded correction area information using both the raw image and the existing correction area information generated. The decompression and ISP 1253 may decompress the compressed raw image and correct the raw image, generating a corrected image. According to an embodiment of the present disclosure, the decompression and ISP 1253 may perform correction using the result of recognition received from the recognition module 1252. The compression module 1254 may compress the corrected image received from the decompression and ISP 1253 as per, e.g., a JPEG compression scheme. The compressed image 1206 may be stored in a compressed image storage unit 1255. Although in FIG. 12 the compressed image storage unit 1255 is labeled "JPEG storage unit," this is done so simply as an example of the compression scheme, and its term may be changed according to the compression scheme. The compressed image 1206 may be stored via the communication modules in the memory 1220 of the electronic device 1200. The decompression and ISP 1253 of the external electronic device 1250 may have high computation capability or more resources than the ISP 1212 of the electronic device 101, and it may accordingly adopt a higher-capacity correction algorithm. Thus, the compressed image 1206 of the corrected image by the external electronic device 1250 may be one further enhanced as compared with the compressed image 1204 of the corrected image 1207 by the electronic device 1200. Hence, the electronic device 1200 may store both the compressed image 1204 and the compressed image 1206 or may exchange the compressed image 1204 with the compressed image 1206 and store it.

Figure 13:
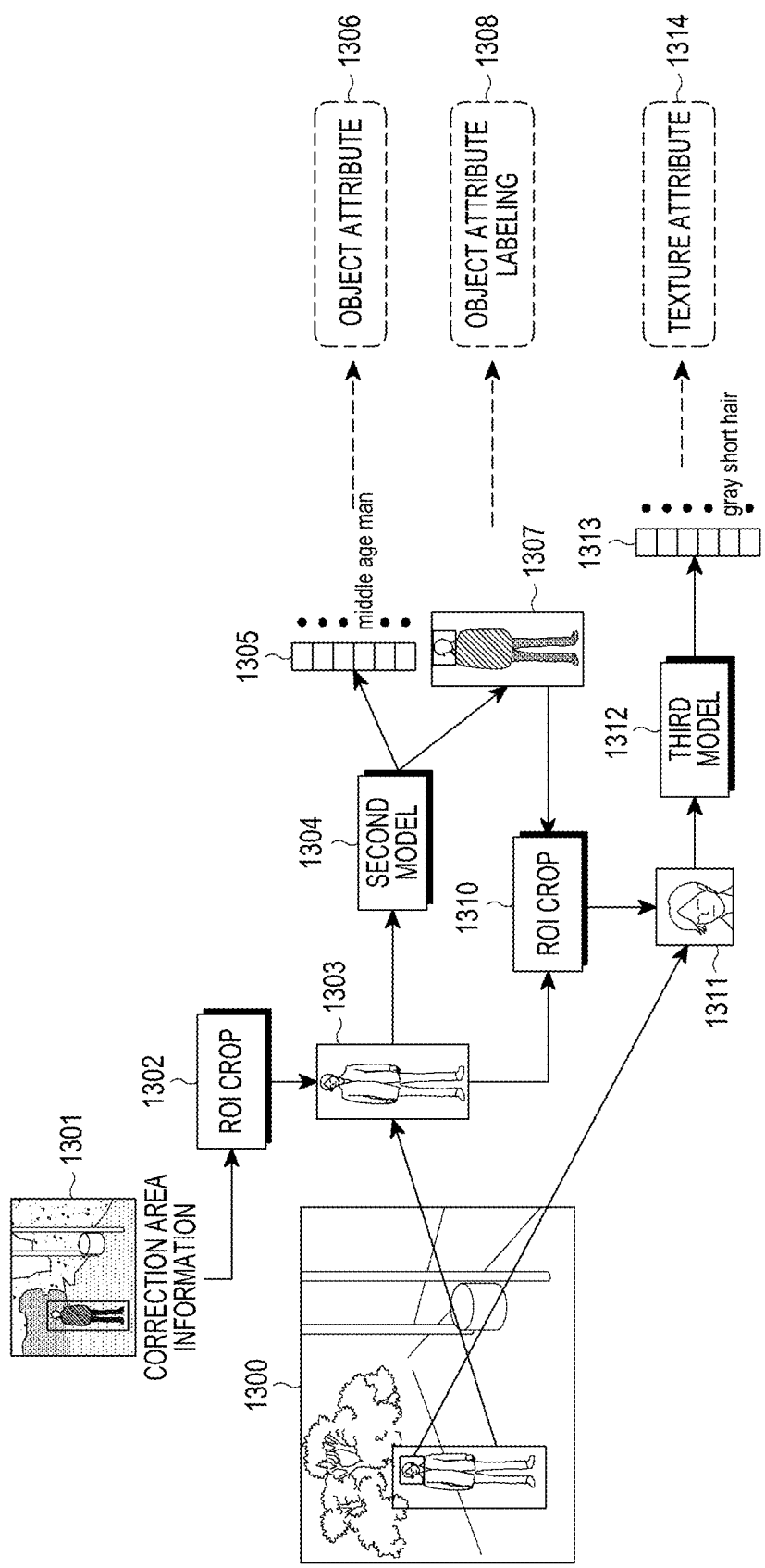
FIG. 13 illustrates a concept view depicting an example of generating expanded correction area information according to an embodiment of the present disclosure.

FIG. 13 illustrates a concept view depicting an example of generating expanded correction area information according to an embodiment of the present disclosure.

According to an embodiment of the present disclosure, an external electronic device 400 (e.g., the external electronic device 1250 or a processor of the external electronic device 400) may store a compressed raw image 1300 (e.g., the raw image 1205 of FIG. 12) in a raw image storage unit (e.g., the raw image storage unit 1256 of FIG. 12) as described above in connection with FIG. 12. The external electronic device 400 (e.g., a processor of the external electronic device 400) may load the compressed raw image 1300 from the raw image storage unit and obtain expanded correction area information using existing correction area information obtained based on a small raw image (e.g., the small raw image 1203 of FIG. 12). For example, the external electronic device 400 (e.g., a processor of the external electronic device 400) may crop (1302) an ROI to be recognized based on a result of existing recognition performed. The external electronic device 400 (e.g., a processor of the external electronic device 400) may crop an ROI 1303 from the raw image 1300. The external electronic device 400 (e.g., a processor of the external electronic device 400) may crop (1302) the ROI 1303 from the raw image 1300 corresponding to the ROI identified in the small raw image. The external electronic device 400 (e.g., a processor of the external electronic device 400) may apply a second recognition model 1304 to the ROI 1303. As a result of applying the second recognition model 1304, the external electronic device 400 (e.g., a processor of the external electronic device 400) may determine that the object attribute 1306 of the ROI 1303 corresponds to "middle age man" among a plurality of object attributes 1305. For example, as in the embodiment of FIG. 8, the external electronic device 400 (e.g., a processor of the external electronic device 400) may obtain the object attribute 813 of "old woman" for the ROI 810 of the small raw image 801. The external electronic device 400 (e.g., a processor of the external electronic device 400) may obtain a more precise object attribute 1306 by applying the second recognition model 1304 to the ROI 1303 of the raw image 1300 which is higher in quality than the small raw image 801. According to an embodiment of the present disclosure, although the result of performing recognition on the small raw image 801 and the result of performing recognition on the raw image 1300 by the external electronic device 400 (e.g., a processor of the external electronic device 400) may be the same, a more precise object attribute may also be obtained as a result of recognition on the raw image 1300 as shown in FIGS. 8 and 13. The external electronic device 400 (e.g., a processor of the external electronic device 400) may label (1308) the object attribute alongside information about the position of the object. As a result of recognition by the second recognition model 1304, texture segmentation may be performed on the ROI 1303. The external electronic device 400 (e.g., a processor of the external electronic device 400) may crop (1310) another ROI 1311 based on a result 1307 of the text segmentation. The external electronic device 400 (e.g., a processor of the external electronic device 400) may apply a third recognition model 1312 to the other ROI 1311. The external electronic device 400 (e.g., a processor of the external electronic device 400) may identify that the texture attribute 1314 of the other ROI 1311 is "gray short hair" among a plurality of texture attributes 1313. For example, as in the embodiment of FIG. 8, the external electronic device 400 (e.g., a processor of the external electronic device 400) may obtain the texture attribute 822, "white short hair," for the other ROI 820 of the small raw image 801. The external electronic device 400 (e.g., a processor of the external electronic device 400) may obtain a more precise object attribute 1314 by applying the third recognition model 1312 to the other ROI 1311 of the raw image 1300 which is higher in quality than the small raw image 801. According to an embodiment of the present disclosure, although the result of performing recognition on the small raw image 801 and the result of performing recognition on the raw image 1300 by the external electronic device 400 (e.g., a processor of the external electronic device 400) may be the same, a more precise texture attribute may also be obtained as a result of recognition on the raw image 1300 as shown in FIGS. 8 and 13. Meanwhile, although not shown, the external electronic device 400 (e.g., a processor of the external electronic device 400) may obtain classification information using the raw image 1300. According to an embodiment of the present disclosure, the external electronic device 400 (e.g., a processor of the external electronic device 400) may use the raw image 1300, but not the existing result of recognition or segmentation on the small raw image, obtaining at least one of the classification information, object attribute, texture attribute, or reliability information. The external electronic device 400 (e.g., a processor of the external electronic device 400) may generate expanded correction area information including at least one of the obtained classification information, object attribute, texture attribute, or reliability information. The external electronic device 400 (e.g., a processor of the external electronic device 400) may generate expanded correction area information in a multi-layered format as shown in, e.g., FIG. 7B, but the format of the expanded correction area information is not limited thereto. The external electronic device 400 (e.g., a processor of the external electronic device 400) may correct the raw image 1300 to generate a corrected image using the expanded correction area information obtained by various schemes as described above. The external electronic device 400 (e.g., a processor of the external electronic device 400) may compress, e.g., the corrected image, and transmit the compressed image through, e.g., the communication interface or communication module of the external electronic device 400 to the electronic device 101. The external electronic device 400 may transmit the obtained expanded correction area information through, e.g., the communication interface or communication module of the external electronic device 400 to the electronic device 101. The electronic device 101 (e.g., the processor 120 or 210) may correct the raw image that it retains using the expanded correction area information, generating a corrected image. The external electronic device 400 (e.g., a processor of the external electronic device 400) may generate pixel adjustment information corresponding to the expanded correction area information and transmit the pixel adjustment information through, e.g., the communication interface or communication module of the external electronic device 400 to the electronic device 101, and the electronic device 101 (e.g., the processor 120 or 210) may store the pixel adjustment information in the raw image, generating a corrected image. The expanded correction area information generated based on the raw image may be larger in size than the correction area information generated based on the small raw image.

Figure 14:
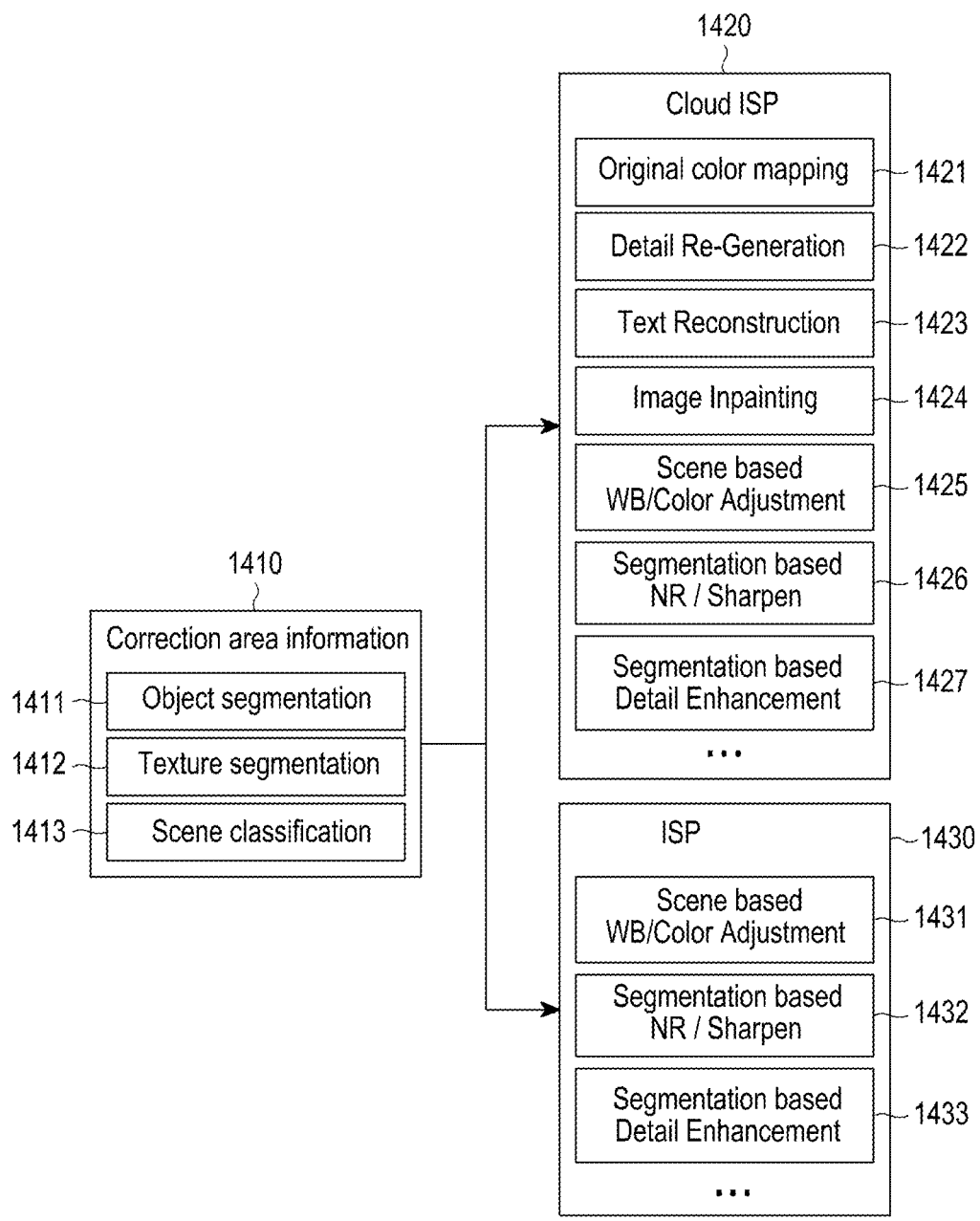
FIG. 14 illustrates a block diagram of an ISP of an electronic device and an ISP of an external electronic device according to an embodiment of the present disclosure.

FIG. 14 illustrates a block diagram of an ISP of an electronic device and an ISP of an external electronic device according to an embodiment of the present disclosure.

According to an embodiment of the present disclosure, correction area information 1410 may include at least one of object segmentation information 1411, texture segmentation information 1412, or classification information (or scene classification information) 1413. The correction area information 1410 may be used in an ISP 1420 of an external electronic device or an ISP 1430 of an electronic device. The external electronic device may be implemented as, e.g., a server, and the ISP 1420 of the external electronic device may thus be termed a cloud ISP. The ISP 1420 of the external electronic device may perform at least one correction scheme among original color mapping 1421, detail re-generation 1422, text reconstruction 1423, image inpainting 1424, scene based white balance (WB)/color adjustment 1425, segmentation based noise reduction (NR)/sharpen 1426, or segmentation based detail enhancement 1427. The ISP 1430 of the electronic device may perform at least one correction scheme among scene based white balance (WB)/color adjustment 1431, segmentation based noise reduction (NR)/sharpen 1432, or segmentation based detail enhancement 1433. The ISP 1430 of the electronic device may heavily apply the sharpen and the detail enhancement to an area corresponding to human hair and the noise reduction to an area corresponding to a human face. The ISP 1420 of the external electronic device may have higher computation capability or more resources than the ISP 1430 of the electronic device and may thus perform additional correction, such as the original color mapping 1421, the detail re-generation 1422, the text reconstruction 1423, and the image inpainting 1424. The ISP 1420 of the external electronic device may generate a feature vector corresponding to, e.g., the classification information 1413, and the ISP 1420 may map the original color of the object or re-generate the detail of the object. The ISP 1420 of the external electronic device may perform the text reconstruction through text recognition and may perform the image inpainting that fills a deleted portion of the object recognized. Accordingly, the raw image corrected by the external electronic device may be of a higher quality than the raw image corrected by the electronic device.

Figure 15:
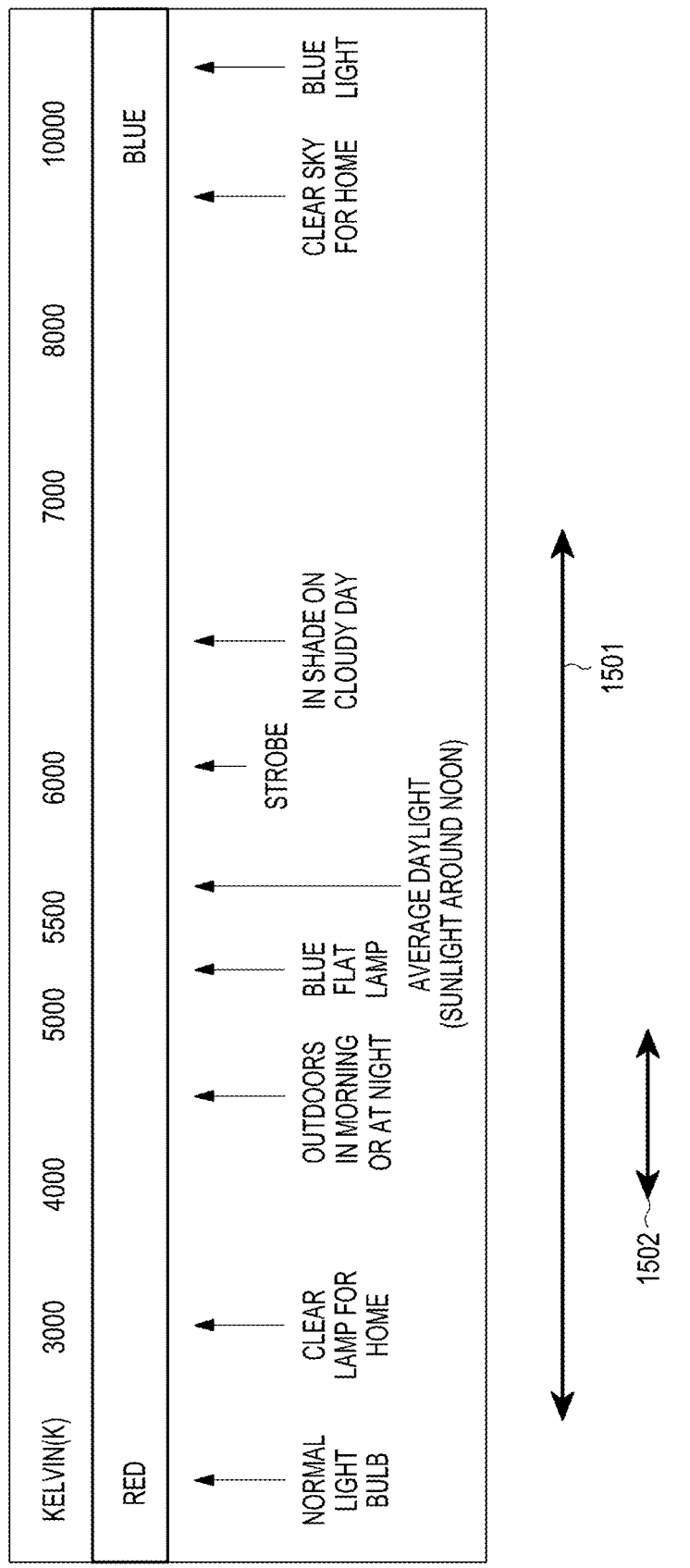
FIG. 15 illustrates a concept view of an example of enhancing accuracy of auto white balance (AWB) using image classifications according to an embodiment of the present disclosure.

FIG. 15 illustrates a concept view of an example of enhancing accuracy of auto white balance (AWB) using image classifications according to an embodiment of the present disclosure.

AWB may be a process that infers points, either white or gray, and adjusts its white balance to be shown in white so as to maintain color constancy under various light sources. Image capturing by the electronic device may be carried out in various illumination environments, such as under low-color temperature illumination by, e.g., a light bulb, indoor illumination by a fluorescent light or light emitting diode (LED) light, or an outdoor environment such as in a shade on a clear day. Despite its ability to distinguish among outdoors, indoors, and nighttime depending on the illuminance (brightness) when image capturing is performed, AWB is highly likely to cause an error in the environments where lights with similar brightnesses but different color temperatures are in use. This is why sensor outputs are shown to be similar in RGB ratio when two different objects are captured under different types of illumination. A bright tree object under an indoor lamp may be confused with a white object under a light bulb. In a similar example, where shady woods or grass spreads broad may cause confusion with a white object captured under a fluorescent light. When the current capturing circumstance may be recognized in classifying images, the range of color temperature supposed to be judged by AWB may reduce, so may AWB errors. White candidates should conventionally be chosen in a broad range 1501 from 2800K to 7000K, which results in the likelihood of an error of AWB. According to an embodiment of the present disclosure, when an image is classified as captured inside an office, a white candidate area may be selected in a range 1502 narrower than the conventional range given common office illumination (e.g., from 3500K to 5500K), allowing AWB enhanced accuracy.

Figure 16A:
FIGS. 16A and 16B illustrate views of images for describing image quality enhancement according to an embodiment of the present disclosure.
Figure 16B:
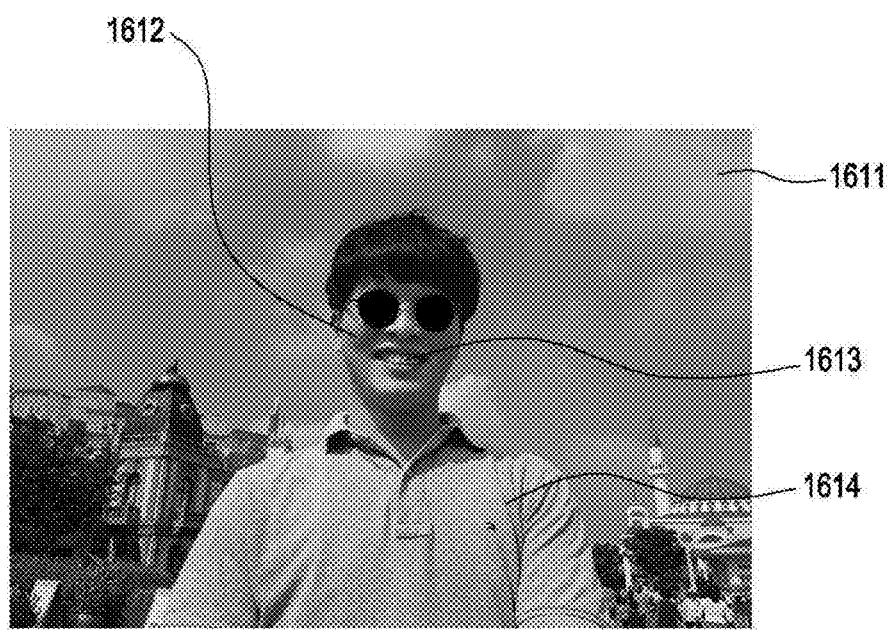

FIGS. 16A and 16B illustrate views of images for describing image quality enhancement according to an embodiment of the present disclosure.

FIG. 16A may illustrate a raw image obtained by an image sensor. The electronic device 101 (e.g., the processor 120 or 210) may generate a small raw image from the raw image and transmit the small raw image through, e.g., the communication interface 170 or communication module 220 to the external electronic device 400. The external electronic device 400 (e.g., a processor of the external electronic device 400) may generate, from the small raw image, correction area information including image classification information, e.g., "outdoor environment," object recognition information indicating that a result of recognition of a first area is "sky," a result of recognition of a second area is "face," a result of recognition of a third area of the second area is "teeth," and a result of recognition of a fourth area is "clothes," and image area information indicating that a result of texture recognition of the fourth area is "cotton." The external electronic device 400 (e.g., a processor of the external electronic device 400) may transmit the correction area information to the electronic device 101 through, e.g., the communication interface or communication module of the external electronic device 400, and the electronic device 101 (e.g., the processor 120 or 210) may correct the raw image using the correction area information. FIG. 16B illustrates a corrected image according to an embodiment of the present disclosure. The electronic device 101 (e.g., the processor 120 or 210) may perform while balancing on a whole raw image based on image classification information, e.g., "outdoor environment." The electronic device 101 may deepen blue by correction (e.g., color contrast adjusting) corresponding to, e.g., the result, "sky," of recognition of the first area 1611. The electronic device 101 (e.g., the processor 120 or 210) may perform correction (e.g., blemish or noise removal or brightening) corresponding to, e.g., the result, "face," of recognition of the second area 1612. The electronic device 101 (e.g., the processor 120 or 210) may perform correction (e.g., whitening) corresponding to, e.g., the result, "teeth," of recognition of the third area 1613. The electronic device 101 (e.g., the processor 120 or 210) may perform correction (e.g., sharpening) corresponding to, e.g., the result, "cotton," of recognition of the fourth area 1614. According to an embodiment of the present disclosure, the external electronic device 400 (e.g., a processor of the external electronic device 400) may generate pixel adjustment information as per the correction area information and transmit the pixel adjustment information to the electronic device 101 through, e.g., the communication interface or communication module of the external electronic device 400. The external electronic device 400 (e.g., a processor of the external electronic device 400) may generate the pixel adjustment information including adjustment information (e.g., deepening blue) corresponding to color contrast adjustment for the pixels in the first area 1611, adjustment information (e.g., adjusting the color values of, and brightening pixels corresponding to noise) corresponding to blemish or noise removal and brightening for the pixels in the second area 1612, adjustment information (e.g., whitening) corresponding to coloring the pixels in the third area 1613, and adjustment information (e.g., adjusting some pixels corresponding to the border into the background color and the rest into the object color) corresponding to sharpening the pixels in the fourth area 1614. The electronic device 101 (e.g., the processor 120 or 210) may adjust the pixels in the raw image according to the pixel adjustment information received from the external electronic device 400, thereby generating a corrected image.

Figure 17:
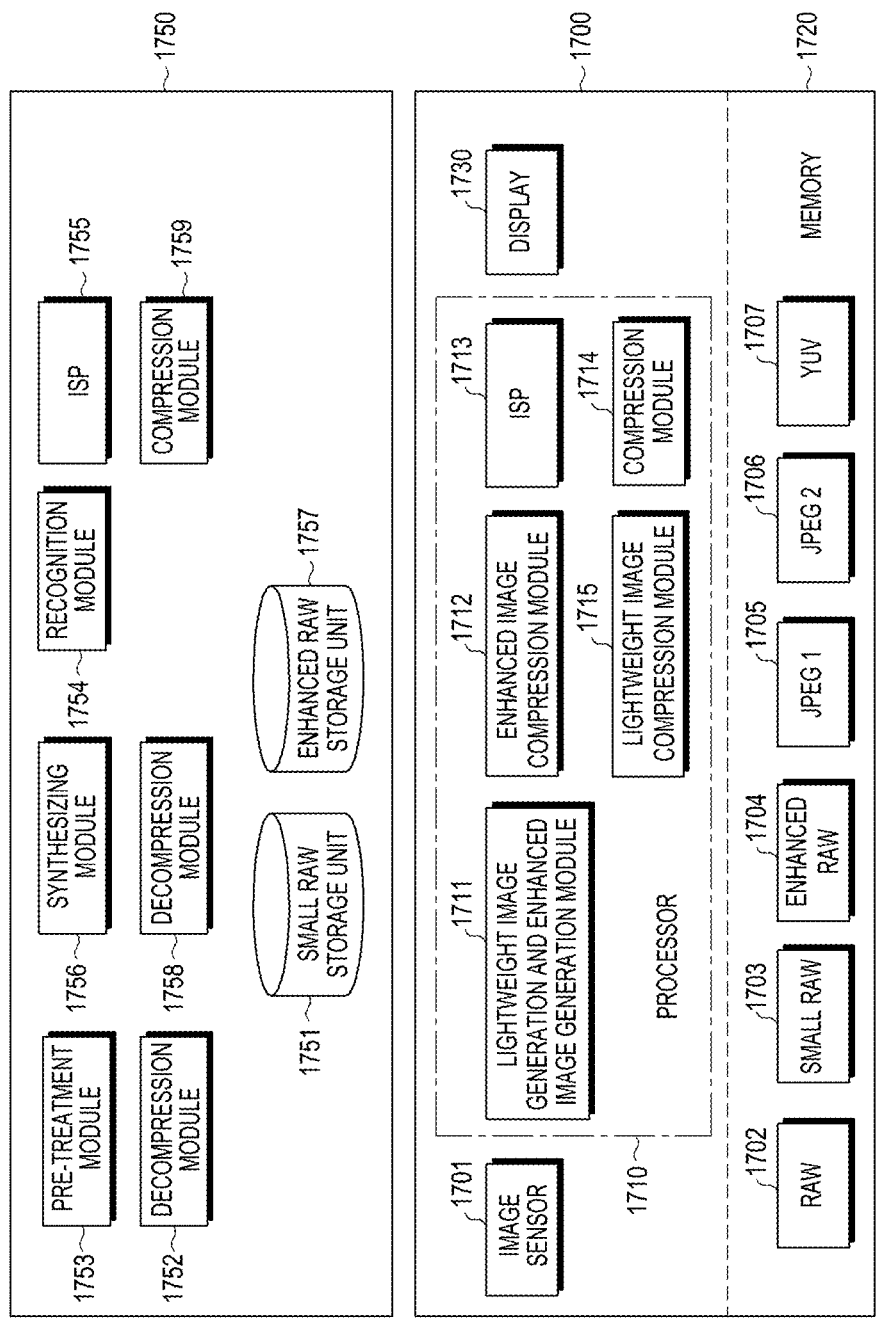
FIG. 17 illustrates a block diagram of an electronic device and an external electronic device according to an embodiment of the present disclosure.

FIG. 17 illustrates a block diagram of an electronic device and an external electronic device according to an embodiment of the present disclosure.

According to an embodiment of the present disclosure, an electronic device 1700 (e.g., the electronic device 101) may include an image sensor 1701, a processor 1710, a memory 1720, and a display 1730. The image sensor 1701 may generate a raw image 1702 and store the raw image 1702 in the memory 1720. A lightweight image and enhanced image generation module 1711 may generate a small raw image 1703 from the raw image 1702, and a lightweight compression module 1715 may compress the small raw image 1703 and store in the memory 1720. The lightweight image and enhanced image generation module 1711 may generate data to compensate for information lost while generating the small raw image 1703, and this may be referred to as an enhanced image (or enhanced raw image) 1704. The same or similar image to the raw image 1702 may be generated by applying the enhanced image 1704 to the small raw image 1703. The small raw image 1703 and the enhanced image 1704, respectively, may be stored via the communication modules in a small raw image storage unit 1751 and an enhanced image storage unit 1757 of an external electronic device 1750 (e.g., the external electronic device 400). A decompression module 1752 may decompress the small raw image and deliver the decompressed image to a pre-treatment module 1753. The pre-treatment module 1753 may perform basic pre-treatments and deliver the resultant image to a recognition module 1754. The recognition module 1754 may recognize the small raw image to generate correction area information and deliver the correction area information to an ISP 1755. A decompression module 1758 may decompress the enhanced image and deliver the same to a synthesizing module 1756. The synthesizing module 1756 may synthesize the same or similar image to the raw image using the enhanced image and deliver the synthesized image to an ISP 1755. The ISP 1755 may generate a corrected image by correcting the synthesized image using the correction area information. A compression module 1759 may compress the corrected image based on a designated compression scheme (e.g., a JPEG compression scheme) and deliver the compressed image 1706 through the communication modules to the electronic device 1700. The compressed image 1706 may be stored in the memory 1720. Meanwhile, an ISP 1713 of the electronic device 1700 may generate a corrected image 1707 using the raw image 1702 and store the corrected image 1707 in the memory 1720. The corrected image 1707 may be stored in, e.g., a VRAM, and may thus be displayed on the display 1730. The corrected image 1707 may be in, e.g., a YUV format but its format is not limited thereto. The compression module 1714 may compress the corrected image 1707 based on a designated compression scheme (e.g., a JPEG scheme) and store the compressed image 1705 in the memory 1720. The electronic device 1700 may store both the compressed image 1705 and the compressed image 1706 or may exchange the compressed image 1705 with the compressed image 1706 and store it.

Figure 18A:
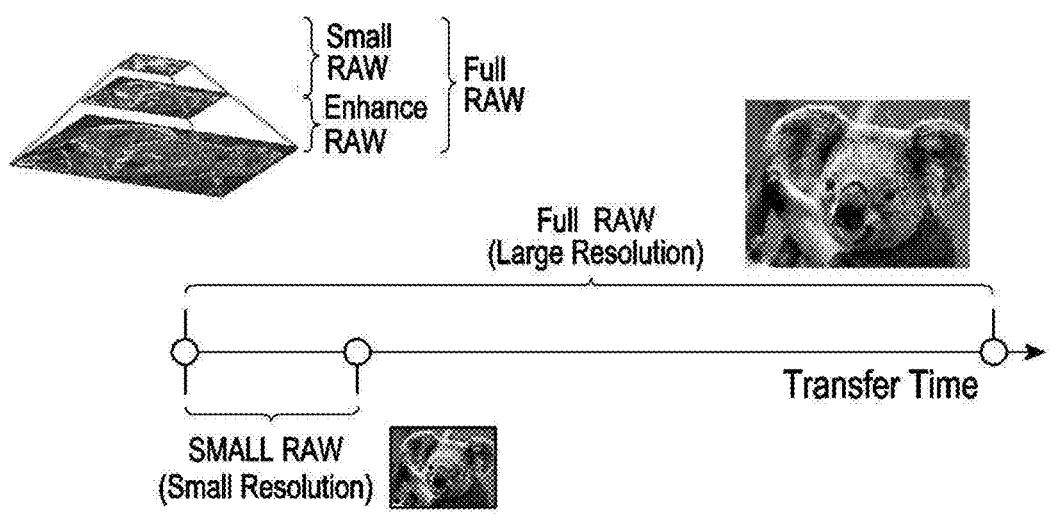
FIGS. 18A to 18C illustrate concept views depicting examples for generating a small raw image and an enhanced image according to an embodiment of the present disclosure.
Figure 18B:
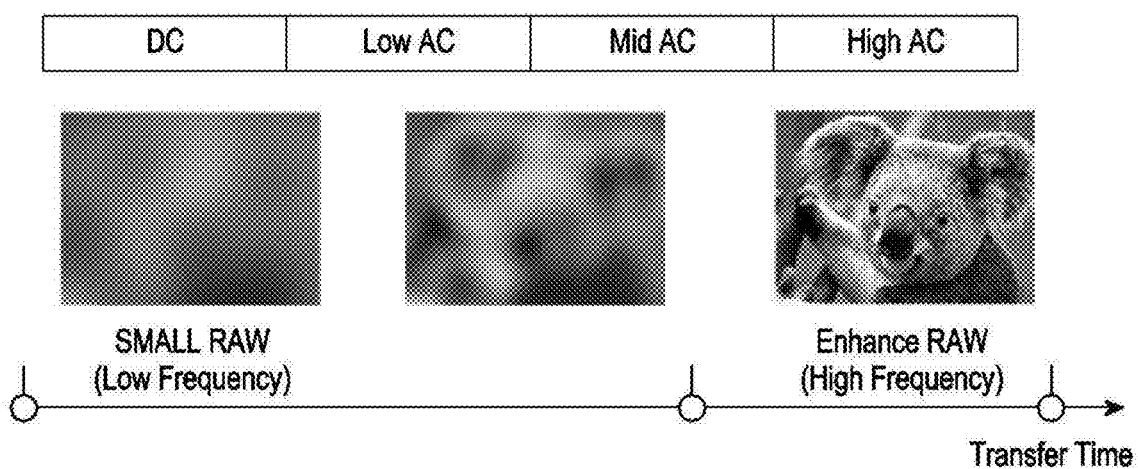
Figure 18C:
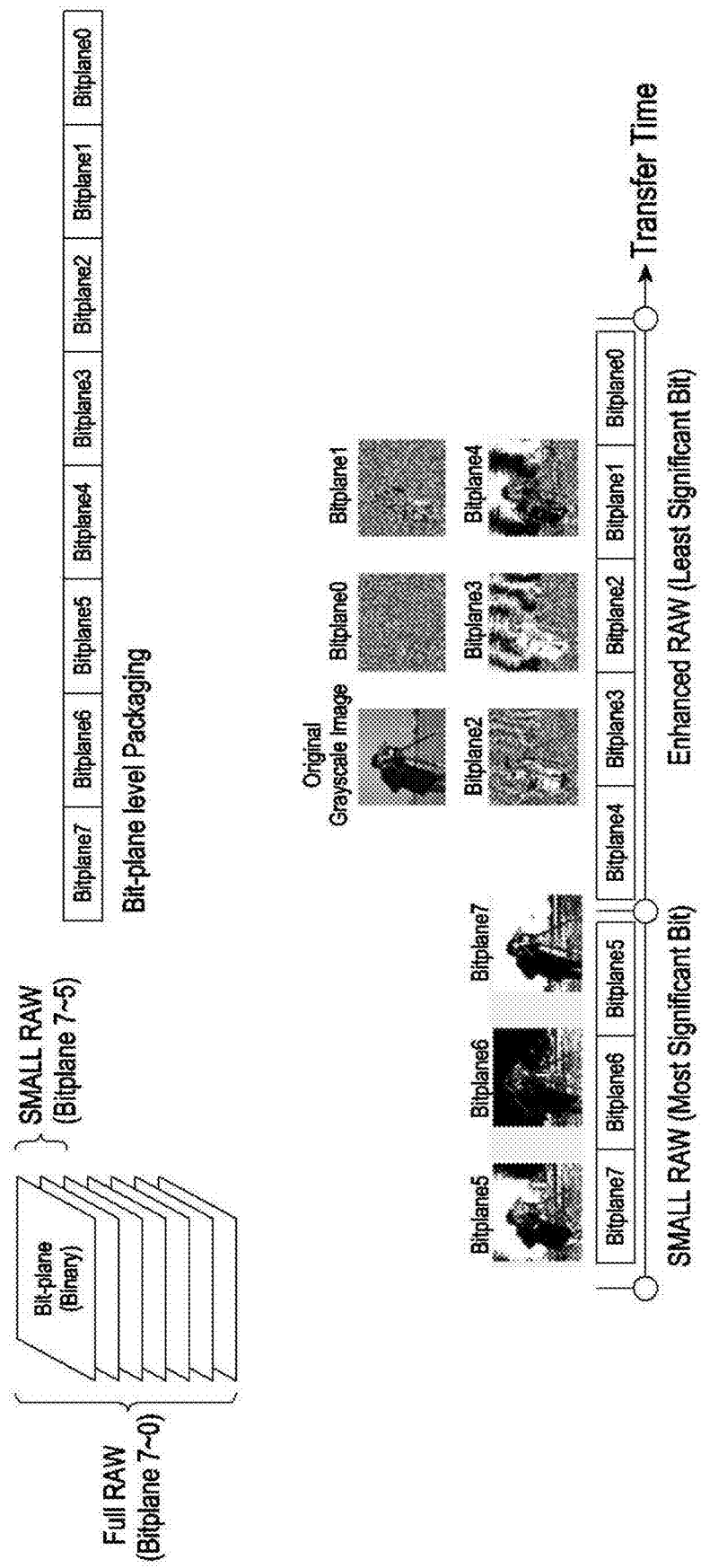

FIGS. 18A to 18C illustrate concept views depicting examples for generating a small raw image and an enhanced image according to an embodiment of the present disclosure.

Referring to FIG. 18A, the electronic device 101 (e.g., the electronic device 1700 or the processor 120 or 210) may generate a small raw image using down-sampling or down-scaling to reduce the resolution of a raw image. The electronic device 101 may up-scale the small raw image into the resolution of the raw image, generating an enhanced image based on differences between the up-scaled image and the original raw image. As shown in FIG. 18A, the transfer time of the raw image may be longer than the transfer time of the small raw image. Referring to FIG. 18B, the electronic device 101 (e.g., the processor 120 or 210) may transform the original raw image by way of, e.g., a discrete cosine transform (DCT) or wavelet and generate the small raw image based on low-frequency components. The electronic device 101 (e.g., the processor 120 or 210) may generate the enhanced image based on high-frequency components. Although the transfer time of the small raw image may be longer than the transfer time of, e.g., the enhanced image, this is a mere example. Referring to FIG. 18C, the electronic device 101 (e.g., the processor 120 or 210) may generate the small raw image using the bit plain corresponding to the high-order bits or most significant bits (MSBs) among all the bit depths of the original raw image. The electronic device 101 (e.g., the processor 120 or 210) may generate the enhanced image using the bit plane corresponding to the low-order bits or least significant bits (LSBs) among all the bit depths of the original raw image. Although the transfer time of the small raw image may be shorter than the transfer time of, e.g., the enhanced image, this is a mere example.

Figure 19:
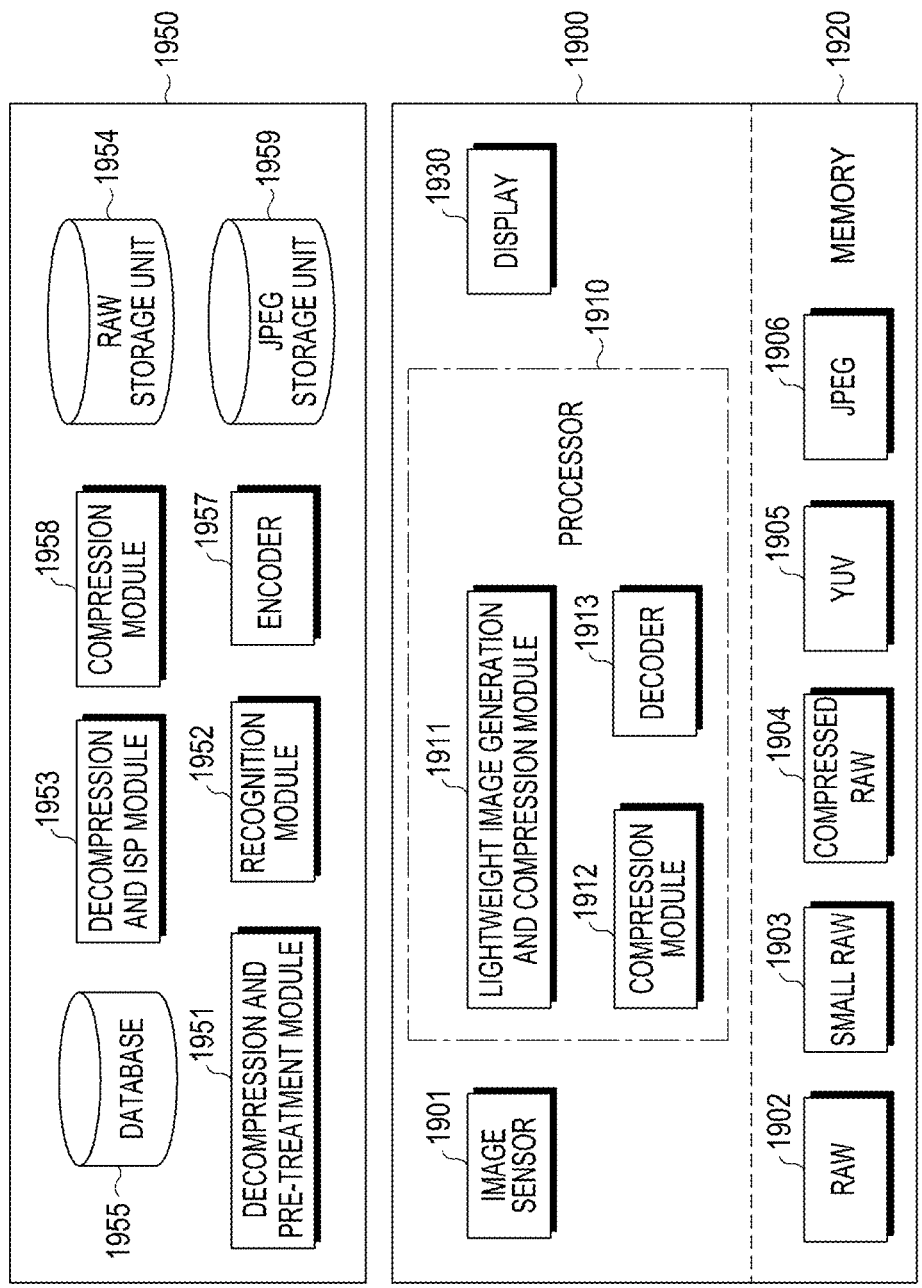
FIG. 19 illustrates a block diagram of an electronic device and an external electronic device according to an embodiment of the present disclosure.

FIG. 19 illustrates a block diagram of an electronic device and an external electronic device according to an embodiment of the present disclosure.

According to an embodiment of the present disclosure, an electronic device 1900 (e.g., the electronic device 101) may include an image sensor 1901, a processor 1910, a memory 1920, and a display 1930. The image sensor 1901 may capture an external object to generate a raw image 1902 and store the raw image 1902 in the memory 1920. The lightweight image generation and compression module 1911 may generate a small raw image 1903 from the raw image 1902. The small raw image 1903 may be transmitted via communication modules to an external electronic device 1950 (e.g., the external electronic device 400). A decompression and pre-treatment module 1951 may decompress and pre-treat the small raw image, and transmit the image to a recognition module 1952. The recognition module 1952 may generate correction area information. A compression module 1912 may compress the raw image 1902 into a compressed raw image 1904 and store the compressed raw image 1904 in the memory 1920. The compressed raw image 1904 may be sent via the communication modules to the external electronic device 1950. The compressed raw image 1904 may be stored in a raw image storage unit 1954 of the external electronic device 1950. A database 1955 of the compressed raw image may be transferred to a decompression and ISP 1953. The decompression and ISP 1953 may decompress the compressed raw image and generate a corrected image using the correction area information received from the recognition module 1952. An encoder 1957 may encode the corrected image. The encoded image 1905 may be transferred via the communication modules to the electronic device 1900. The encoded image 1905 may be stored in the memory 1920, e.g., a VRAM. A decoder 1913 may decode the encoded image 1905 from the VRAM and display the decoded image on the display 1930. The corrected image from the decompression and ISP 1953 may be transferred to the compression module 1958. The compression module 1958 may perform compression in, e.g., a JPEG compression scheme, generating a compressed image. The compressed image may be stored in a compressed image storage unit 1959 and may be transferred via the communication modules to the electronic device 1950. The compressed image 1906 may be stored in the memory 1920. As set forth above, the electronic device 1900 may correct images to obtain compressed images although it does not include an ISP.

Figure 20:
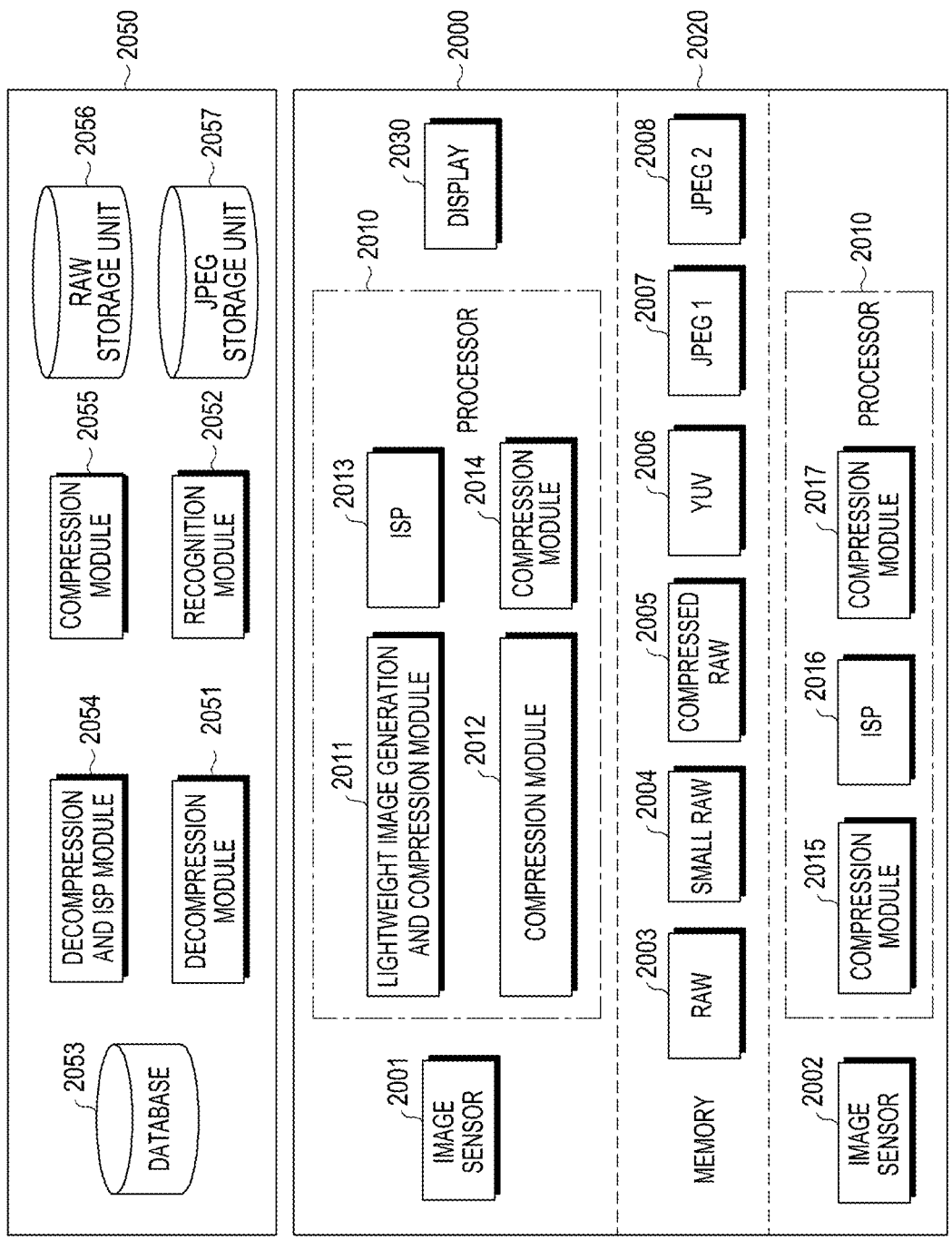
FIG. 20 illustrates a block diagram of an electronic device including a plurality of image sensors according to an embodiment of the present disclosure.

FIG. 20 illustrates a block diagram of an electronic device including a plurality of image sensors according to an embodiment of the present disclosure.

According to an embodiment of the present disclosure, an electronic device 2000 (e.g., the electronic device 101) may include a plurality of image sensors 2001 and 2002, a processor 2010, a memory 2020, and a display 2030. The plurality of image sensors 2001 and 2002 may generate raw images 2003. A lightweight image generation and compression module 2011 may generate small raw images 2004 using the raw images 2003. According to an embodiment of the present disclosure, the lightweight image generation and compression module 2011 may generate and compress the small raw images 2004, which correspond to all of the raw images 2003 generated by the plurality of image sensors 2001 and 2002, or may generate the small raw images 2004 from some of the raw images 2003 generated. The small raw images 2004 may be transferred via communication modules to an external electronic device 2050 (e.g., the external electronic device 400). Compression modules 2012 and 2015 may compress the raw images 2003 into compressed raw images 2005 and store the compressed raw images 2005 in the memory 2020. The compressed raw images 2005 may be transferred via the communication modules to an external electronic device 2050 and stored in a raw image storage unit 2056. A decompression module 2051 may decompress the small raw image 2004 and transfer the decompressed image to a recognition module 2052. The recognition module 2052 may generate correction area information from the small raw images and deliver the correction area information via the communication modules to ISPs 2013 and 2016. The ISPs 2013 and 2016 may correct the raw images 2003 using the correction area information, generating corrected images 2006. The corrected images 2006 may be stored in, e.g., a VRAM, and may be displayed on the display 2030. The corrected images 2006 may be transferred to compression modules 2014 and 2017 and may be compressed by a designated compression scheme (e.g., a JPEG scheme). The compressed images 2007 may be stored in the memory 2020. A decompression and ISP module 2054 may receive and decompress a database 2053 of the compressed raw images. The decompression and ISP module 2054 may perform correction and transfer the corrected images to the compression module 2055. The compression module 2055 may generate compressed images 2008 and store the compressed images 2008 in a compressed image storage unit 2057. The compressed images 2008 may be transferred via communication modules to the electronic device 2000 and stored in, e.g., the memory 2020. The electronic device 2000 may store both the compressed images 2007 and the compressed images 2008 or may exchange the compressed images 2007 with the compressed images 2008 and store them. According to an embodiment of the present disclosure, the electronic device 2000 may include a single image sensor (e.g., a dual-photodiode (2PD) image sensor). The single image sensor may generate a plurality of raw images corresponding to a plurality of gaze points also in which case a plurality of raw images may be processed as shown in FIG. 20. According to an embodiment of the present disclosure, the electronic device 2000 may generate a depth map using the plurality of raw images and transmit the depth map or its down-sampled map to the external electronic device 2050. The external electronic device 2050 may generate correction area information additionally using the depth map or down-sampled map.

Figure 21:
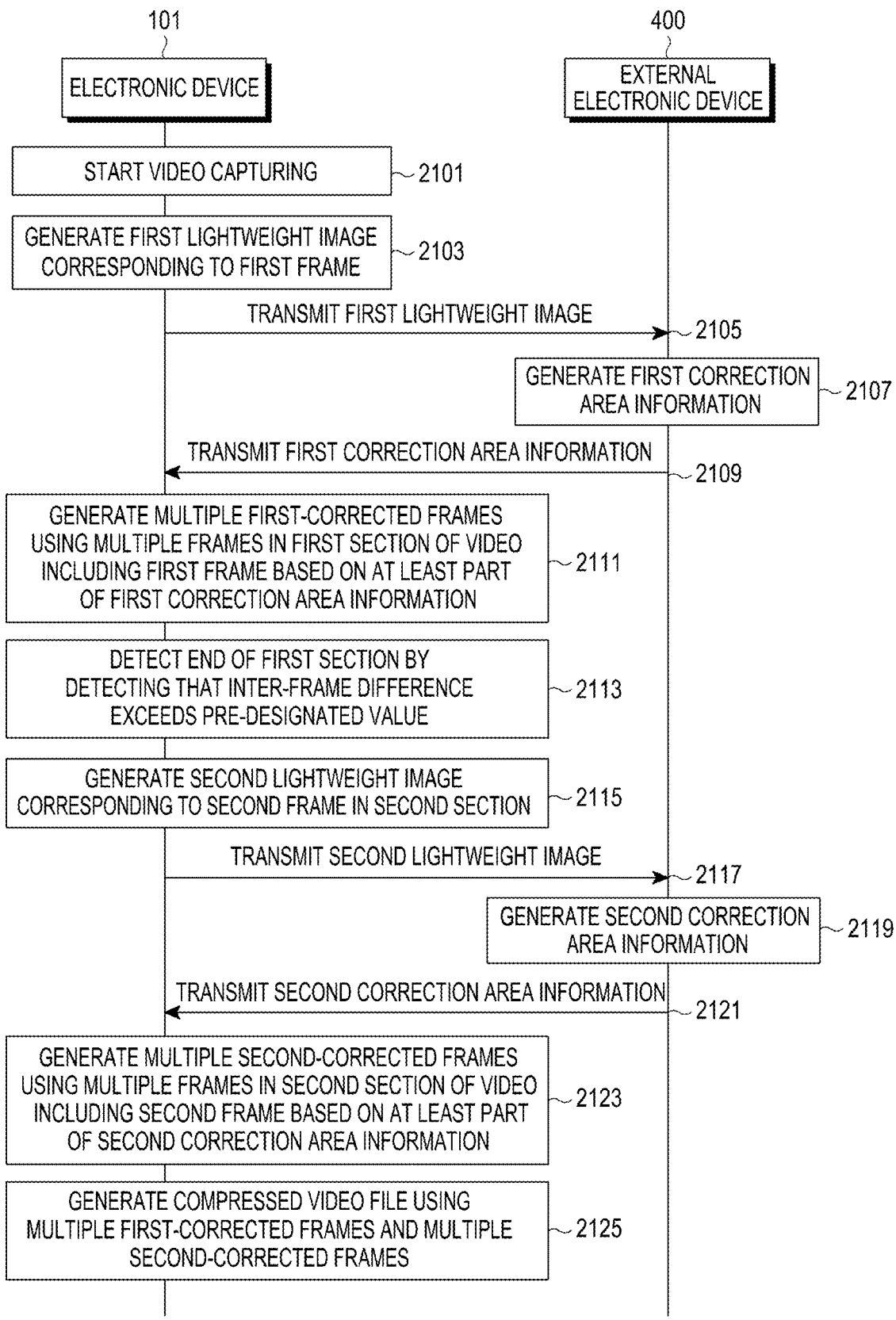
FIG. 21 illustrates a flowchart depicting a method for operating an electronic device and an external electronic device according to an embodiment of the present disclosure.
Figure 22:
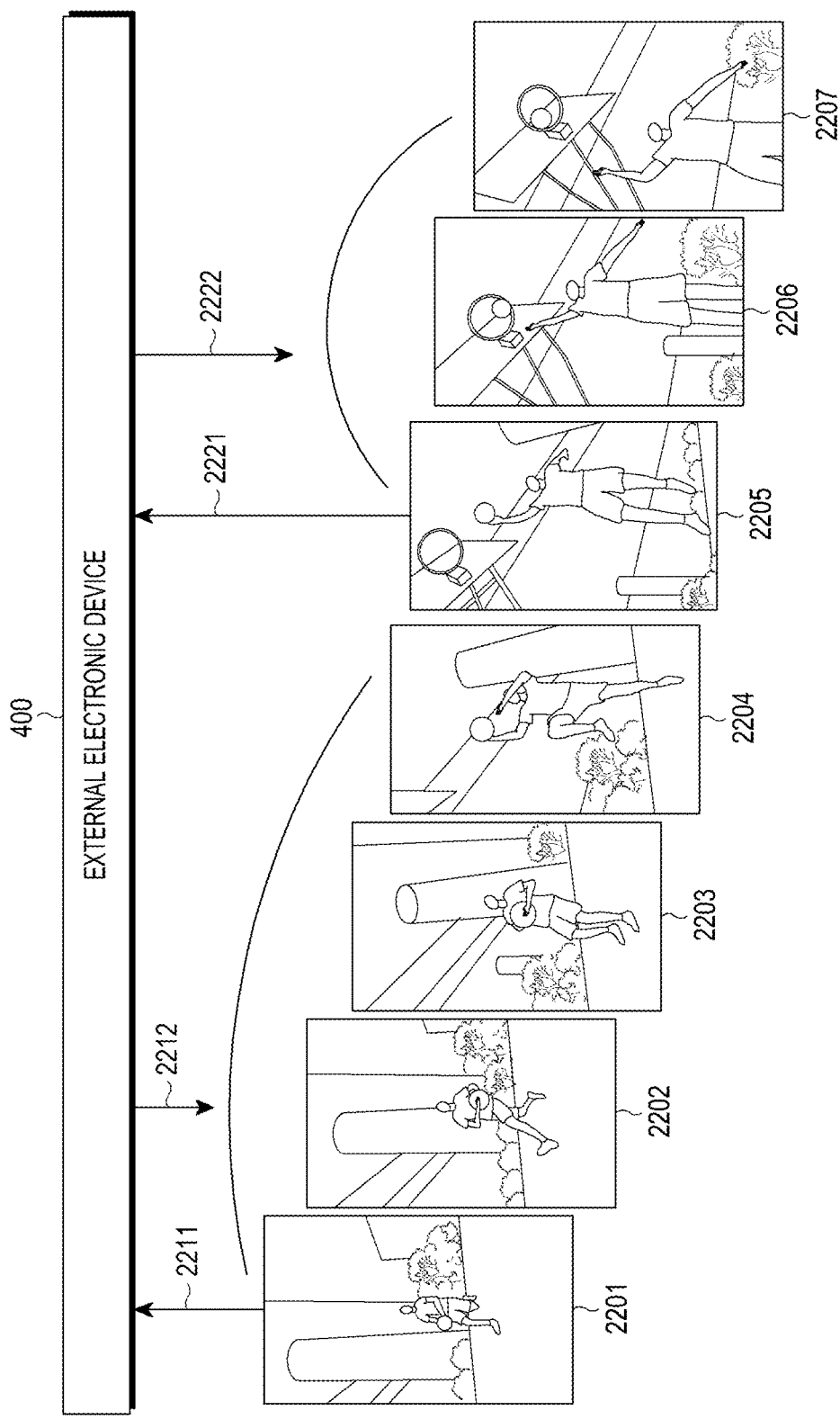
FIG. 22 illustrates a concept view illustrating a video frame according to an embodiment of the present disclosure.

FIG. 21 illustrates a flowchart depicting a method for operating an electronic device and an external electronic device according to an embodiment of the present disclosure. The embodiment of FIG. 21 is described in greater detail with reference to FIG. 22. FIG. 22 illustrates a concept view of a frame of another video according to an embodiment of the present disclosure.

According to an embodiment of the present disclosure, the electronic device 101 (e.g., the processor 120 or 210) may start video capturing in operation 2101. The electronic device 101 (e.g., the processor 120 or 210) may obtain a plurality of frames using an image sensor, e.g., the camera module 291, as per the video capturing. For example, the electronic device 101 (e.g., the processor 120 or 210) may obtain a plurality of frames 2201 to 2207 as shown in FIG. 22. In operation 2103, the electronic device 101 (e.g., the processor 120 or 210) may generate a first lightweight image corresponding to a first frame 2201. The electronic device 101 (e.g., the processor 120 or 210) may down-sample or down-scale the first frame 2201 into the first lightweight image 2211. In operation 2105, the electronic device 101 (e.g., the processor 120 or 210) may transmit the first lightweight image 2211 to the external electronic device 400 through, e.g., the communication interface 170 or communication module 220.

According to an embodiment of the present disclosure, the external electronic device 400 (e.g., a processor of the external electronic device 400) may generate first correction area information 2212 in operation 2107. The external electronic device 400 (e.g., a processor of the external electronic device 400) may recognize the first lightweight image and generate the first correction area information 2212 based on, at least, a result of the recognition of the first lightweight image. In operation 2109, the external electronic device 400 (e.g., a processor of the external electronic device 400) may transmit the first correction area information 2212 to the electronic device 101 through, e.g., the communication interface or communication module of the external electronic device 400.

According to an embodiment of the present disclosure, in operation 2111, the electronic device 101 (e.g., the processor 120 or 210) may generate a plurality of first-corrected frames using the plurality of frames 2201, 2202, 2203, and 2204 within a first section of the video including the first frame 2201 based on at least part of the first correction area information 2212. The electronic device 101 (e.g., the processor 120 or 210) may also perform correction, using the first correction area information 2212, on the frames (e.g., the frames 2202, 2203, and 2204) whose similarities to the first frame 2201 are a designated value or less, as well as the first frame 2201.

According to an embodiment of the present disclosure, in operation 2113, the electronic device 101 (e.g., the processor 120 or 210) may detect that the inter-frame difference exceeds a pre-designated value, thereby detecting the end of the first section. For example, the differences between the second frame 2205 and the frames 2201, 2202, 2203, and 2204 of the first section may exceed the designated value. The electronic device 101 (e.g., the processor 120 or 210) may detect that the differences between the second frame 2205 and the frames 2201, 2202, 2203, and 2204 of the first section exceed the designated value as per various image comparison schemes. In operation 2115, the electronic device 101 (e.g., the processor 120 or 210) may generate a second lightweight image 2221 corresponding to a second frame 2205 of a second section. The electronic device 101 (e.g., the processor 120 or 210) may down-sample or down-scale the second frame 2205 into the second lightweight image 2221. In operation 2117, the electronic device 101 (e.g., the processor 120 or 210) may transmit the second lightweight image 2221 to the external electronic device 400 through, e.g., the communication interface 170 or communication module 220.

According to an embodiment of the present disclosure, the external electronic device 400 (e.g., a processor of the external electronic device 400) may generate second correction area information 2222 in operation 2119. In operation 2121, the external electronic device 400 (e.g., a processor of the external electronic device 400) may transmit the second correction area information 2222 to the electronic device 101 through, e.g., the communication interface or communication module of the external electronic device 400. According to an embodiment of the present disclosure, in operation 2123, the electronic device 101 (e.g., the processor 120 or 210) may generate a plurality of second-corrected frames using a plurality of frames (e.g., the frames 2205, 2206, and 2207) within the second section of the video including the second frame 2205 based on at least part of the second correction area information 2222. In operation 2125, the electronic device 101 (e.g., the processor 120 or 210) may generate a compressed video file using the plurality of first-corrected frames and the plurality of second-corrected frames. The electronic device 101 (e.g., the processor 120 or 210) may generate small raw images for all the frames of the video and abstain from uploading them onto the external electronic device 400, or the electronic device 101 (e.g., the processor 120 or 210) may generate small raw images for some frames and upload them. The electronic device 101 (e.g., the processor 120 or 210) may apply the received correction area information not only to one raw image but also to other raw images. According to an embodiment of the present disclosure, the electronic device 101 (e.g., the processor 120 or 210) may skip some of the plurality of frames and transmit the small raw images for the frames to the external electronic device 400 periodically at a pre-designated rate.

According to an embodiment of the present disclosure, the electronic device 101 (e.g., the processor 120 or 210) may correct per-section frames based on the correction area information and store the same in the VRAM. Thus, the electronic device 101 (e.g., the processor 120 or 210) may display quality-enhanced video frames even during a preview process. According to an embodiment of the present disclosure, the electronic device 101 (e.g., the processor 120 or 210) may periodically or continuously send at least some of screens to be displayed in the live view (or preview) while capturing the video and correct at least some of the frames included in the live view using the received correction area information, providing a live view including corrected images. According to an embodiment of the present disclosure, the electronic device 101 (e.g., the processor 120 or 210) may periodically or continuously send at least part of the live view to the external electronic device and display corrected images received from the external electronic device in at least part of the live view. According to an embodiment of the present disclosure, the electronic device 101 (e.g., the processor 120 or 210) may display images corrected using the correction area information received from the external electronic device or corrected images received from the external electronic device even when it is not video capturing.

According to an embodiment of the present disclosure, a method for operating an electronic device may comprise obtaining a first image corresponding to an external object using the camera, generating a second image smaller in data size than the first image using the first image, transmitting the second image to an external electronic device so that the external electronic device generates correction area information based on information associated with an image area identified from the second image, receiving the generated correction area information from the external electronic device through the communication module, and performing correction using the first image based on at least part of the correction area information.

According to an embodiment of the present disclosure, generating the second image may include generating the second image by performing at least one of adjusting a resolution of the first image, selecting at least some of a plurality of frequency bands of the first image, or selecting at least one of a plurality of bit plain levels of the first image.

According to an embodiment of the present disclosure, the method for operating the electronic device may further comprise transmitting the first image to the external electronic device so that the external electronic device generates other correction area information using the first image and the correction area information.

According to an embodiment of the present disclosure, the method for operating the electronic device may further comprise receiving a fourth image generated by the external electronic device correcting the first image using the other correction area information or receiving the other correction area information.

According to an embodiment of the present disclosure, the information associated with the at least one image area may include at least one of a position of a first object included in the second image, a result of object recognition of the first object, a reliability of the result of the object recognition of the first object, a position of a second object included in the second image, a result of texture recognition of the second object, or an accuracy of the texture recognition of the second object.

According to an embodiment of the present disclosure, receiving the generated correction area information from the external electronic device may include receiving the correction area information that further includes image classification information from the external electronic device, and performing the correction using the first image based on at least part of the correction area information may include correcting the first image using at least one of the image classification information or the information associated with the image area.

According to an embodiment of the present disclosure, the method for operating the electronic device may further comprise displaying the corrected image through the display.

According to an embodiment of the present disclosure, the method for operating the electronic device may further comprise transmitting metadata associated with the first image to the external electronic device and receiving the correction area information generated by the external electronic device using the metadata and the second image.

According to an embodiment of the present disclosure, performing the correction using the first image based on at least part of the correction area information may include performing at least one of applying a first effect corresponding to a result of recognition of an object for a pixel of the first image corresponding to a position of the object included in the correction area information or applying a second effect corresponding to classification information for the first image.

According to an embodiment of the present disclosure, performing the correction using the first image based on at least part of the correction area information may include generating the corrected first image using a format different from the format of the first image.

According to an embodiment of the present disclosure, the method for operating the electronic device may further comprise generating the second image and a fifth image, which together with the second image constitutes the first image, using the first image and transmitting the fifth image to the external electronic device so that the external electronic device constitutes the first image with the second image and the fifth image and generates other correction area information using the correction area information and the first image.

According to an embodiment of the present disclosure, generating the fifth image may include selecting some of a plurality of frequency bands of the first image to generate the second image and select others of the plurality of frequency bands to generate the fifth image, selecting some of a plurality of bit plains of the first image to generate the second image and selecting others of the plurality of bit plains to generate the fifth image, or down-scaling the first image to generate the second image, up-scaling the second image into a resolution of the first image, and obtaining a difference between the up-scaled image and the first image to generate the fifth image.

According to an embodiment of the present disclosure, the method for operating the electronic device may comprise obtaining a first image from another electronic device, identifying at least one image area from the first image based on first image recognition, generating correction area information corresponding to the first image based on, at least, information associated with the at least one image area, and transmitting the correction area information to an external electronic device.

According to an embodiment of the present disclosure, the method for operating the electronic device may further comprise classification information corresponding to the first image based on second image recognition. Generating correction area information corresponding to the first image based on at least information associated with the at least one image area may include generating the correction area information corresponding to the first image based on at least the classification information or the information associated with the at least one image area.

According to an embodiment of the present disclosure, the method for operating the electronic device may further comprise receiving the first image from the external electronic device.

According to an embodiment of the present disclosure, generating the correction area information may include identifying at least one area corresponding to an object from the at least one image area and generating the correction area information using information related to the object.

According to an embodiment of the present disclosure, generating the correction area information may include identifying at least one area corresponding to a texture from the at least one image area and generating the correction area information using information related to the texture.

According to an embodiment of the present disclosure, generating the correction area information may include determining at least one reliability corresponding to splitting or classifying the at least one image area and generating the correction area information using the at least one reliability.

According to an embodiment of the present disclosure, the method for operating the electronic device may further comprise receiving a second image different in size from the first image from the external electronic device and generating other correction area information using the second image and the correction area information.

According to an embodiment of the present disclosure, the method for operating the electronic device may further comprise generating a corrected image using the second image based on at least part of the other correction area information.

According to an embodiment of the present disclosure, performing the correction using the second image may include identifying a first area and a second area of the second image for the correction based on at least part of the other correction area information, correcting the first area using first correction information designated corresponding to the first area, and correcting the second area using second correction information designated corresponding to the second area.

According to an embodiment of the present disclosure, a method for operating an electronic device may comprise obtaining a first image corresponding to an external object, generating a second image smaller in data size than the first image using the first image, transmitting the second image to an external electronic device so that the external electronic device generates pixel adjustment information to adjust each of pixels in at least a portion of the second image, receiving the generated pixel adjustment information from the external electronic device, and correcting each of the pixels in the at least portion of the first image using the received pixel adjustment information.

According to an embodiment of the present disclosure, a method for operating an electronic device may comprise obtaining a first image corresponding to an external object, generating a second image smaller in data size than the first image using the first image, transmitting the first image and the second image to an external electronic device, receiving, from the external electronic device, an image encoded after the first image is corrected by correction area information obtained by the second image, decoding the received encoding image and displaying the decoded image, receiving, from the external electronic device, an image compressed after the first image is corrected, in response to the transmission, and storing the received compressed image.

According to an embodiment of the present disclosure, a method for operating an electronic device may comprise obtaining a plurality of images for constituting a video using the camera, generating a first lightweight image smaller in data size than a first image using the first image included in a first section of the plurality of images, transmitting the first lightweight image to an external electronic device, receiving first correction area information generated based on the first lightweight image, correcting images included in the first section based on the first correction area information, generating a second lightweight image smaller in data size than the first image using a second image included in a second section of the plurality of images, transmitting the second lightweight image to the external electronic device, receiving second correction area information generated based on the second lightweight image, and correcting images included in the second section based on the second correction area information.

According to an embodiment of the present disclosure, transmitting the second lightweight image may include, upon detecting an image whose difference from an image in the first section exceeds a designated threshold, determining an end of the first section, classifying the image whose difference exceeds the designated threshold as being in the second section, and transmitting the second lightweight image.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The 'module' may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing commands that are executed by at least one processor to enable the at least one processor to perform at least one operation that comprises obtaining a first image from another electronic device, identifying at least one image area from the first image based on first image recognition, generating correction area information corresponding to the first image based on, at least, information associated with the at least one image area, and transmitting the correction area information to an external electronic device.

The at least one operation may comprise obtaining a first image from another electronic device, identifying at least one image area from the first image based on first image recognition, generating correction area information corresponding to the first image based on, at least, information associated with the at least one image area, and transmitting the correction area information to an external electronic device.

The at least one operation may comprise obtaining a first image corresponding to an external object, generating a second image smaller in data size than the first image using the first image, transmitting the second image to an external electronic device so that the external electronic device generates pixel adjustment information to adjust each of pixels in at least a portion of the second image, receiving the generated pixel adjustment information from the external electronic device, and correcting each of the pixels in the at least portion of the first image using the received pixel adjustment information.

The at least one operation may comprise obtaining a first image corresponding to an external object, generating a second image smaller in data size than the first image using the first image, transmitting the first image and the second image to an external electronic device, receiving, from the external electronic device, an image encoded after the first image is corrected by correction area information obtained by the second image, decoding the received encoding image and displaying the decoded image, receiving, from the external electronic device, an image compressed after the first image is corrected, in response to the transmission, and storing the received compressed image.

The at least one operation may comprise obtaining a plurality of images for constituting a video using the camera, generating a first lightweight image smaller in data size than a first image using the first image included in a first section of the plurality of images, transmitting the first lightweight image to an external electronic device, receiving first correction area information generated based on the first lightweight image, correcting images included in the first section based on the first correction area information, generating a second lightweight image smaller in data size than the first image using a second image included in a second section of the plurality of images, transmitting the second lightweight image to the external electronic device, receiving second correction area information generated based on the second lightweight image, and correcting images included in the second section based on the second correction area information.

As is apparent from the foregoing description, according to various embodiments of the present disclosure, there may be provided an electronic device, and method for operating the same, which may receive image correction information from an external electronic device and process images based on the received image correction information.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a camera;
a communication module; and
a processor operably coupled with the camera and the communication module, wherein the processor is configured to:
obtain a first image corresponding to an external object using the camera,
generate metadata associated with the first image and generate a second image smaller in data size than the first image using the first image,
transmit the second image and the metadata to an external electronic device through the communication module,
receive correction area information from the external electronic device through the communication module, wherein the correction area information is based on the metadata and information associated with an image area identified from the second image and wherein the correction area information comprises a plurality of maps, and
perform correction using the first image based on at least part of the correction area information,
wherein the plurality of maps are related to a result of object recognition of at least one object in the second image and a result of texture recognition in the second image.

2. The electronic device of claim 1, wherein the processor is configured to generate the second image by performing at least one of:
adjusting a resolution of the first image,
selecting at least some of a plurality of frequency bands of the first image, or
selecting at least one of a plurality of bit plain levels of the first image.

3. The electronic device of claim 1, wherein the processor is configured to transmit the first image through the communication module to the external electronic device so that the external electronic device generates other correction area information using the first image and the correction area information.

4. The electronic device of claim 1, wherein the correction area information associated with the image area includes at least one of:
a position of a first object included in the second image,
a result of object recognition of the first object, a reliability of the result of the object recognition of the first object,
a position of a second object included in the second image,
a result of texture recognition of the second object, or
an accuracy of the texture recognition of the second object.

5. The electronic device of claim 1, wherein the processor is configured to:
receive the correction area information that includes image classification information from the external electronic device through the communication module; and
correct the first image using at least one of the image classification information or the correction area information associated with the image area.

6. The electronic device of claim 1, wherein the processor is configured to receive, through the communication module, the correction area information generated by the external electronic device using the metadata and the second image.

7. The electronic device of claim 1, wherein the processor is configured to perform at least one of:
applying a first effect corresponding to a result of recognition of an object for a pixel of the first image corresponding to a position of the object included in the correction area information; or
applying a second effect corresponding to classification information for the first image.

8. The electronic device of claim 1, wherein the processor is configured to generate the corrected first image using a format different from a format of the first image, as part of the correction.

9. The electronic device of claim 1, wherein the processor is configured to:
generate the second image and a fifth image, that together with the second image constitutes the first image, using the first image; and
transmit the fifth image through the communication module to the external electronic device so that the external electronic device constitutes the first image with the second image and the fifth image and generates other correction area information using the correction area information and the first image.

10. The electronic device of claim 9, wherein the processor is configured to:
select some of a plurality of frequency bands of the first image to generate the second image;
select others of the plurality of frequency bands to generate the fifth image, and select some of a plurality of bit plains of the first image to generate the second image and select others of the plurality of bit plains to generate the fifth image; or
down-scale the first image to generate the second image, up-scale the second image into a resolution of the first image, and obtain a difference between the up-scaled second image and the first image to generate the fifth image.

11. An electronic device, comprising:
a communication module; and
a processor operably coupled with the communication module, wherein the processor is configured to:
obtain a first image and metadata associated with a second image through the communication module from another electronic device,
identify at least one image area from the first image based on first image recognition,
generate correction area information corresponding to the first image based on, at least, information associated with the at least one image area and the metadata, and
transmit the correction area information through the communication module to an external electronic device,
wherein the correction area information comprises a plurality of maps, and
wherein the plurality of maps are related to a result of object recognition of at least one object in the first image and a result of texture recognition in the first image.

12. The electronic device of claim 11, wherein the processor is configured to:
generate classification information corresponding to the first image based on second image recognition; and
generate the correction area information based on at least one of the classification information or the information associated with the at least one image area.

13. The electronic device of claim 11, wherein the processor is configured to receive the first image through the communication module from the external electronic device.

14. The electronic device of claim 11, wherein the processor is configured to:
identify at least one area corresponding to an object from the at least one image area; and
generate the correction area information using information related to the object.

15. The electronic device of claim 11, wherein the processor is configured to:
identify at least one area corresponding to a texture from the at least one image area; and
generate the correction area information using information related to the texture.

16. The electronic device of claim 11, wherein the processor is configured to:
determine at least one reliability corresponding to splitting or classifying the at least one image area; and
generate the correction area information using the at least one reliability.

17. The electronic device of claim 11, wherein the processor is configured to:
receive the second image different in size from the first image from the external electronic device through the communication module; and
generate other correction area information using the second image and the correction area information.

18. The electronic device of claim 17, wherein the processor is configured to generate a third image corrected using the second image based on at least part of the other correction area information.

19. The electronic device of claim 17, wherein the processor is configured to:
identify a first area and a second area of the second image for the correction based on at least part of the other correction area information,
correct the first area using first correction information designated corresponding to the first area; and
correct the second area using second correction information designated corresponding to the second area.

20. A method for operating an electronic device, comprising:
obtaining a first image corresponding to an external object using a camera, generating metadata associated with the first image and generating a second image smaller in data size than the first image using the first image, transmitting the second image and the metadata to an external electronic device, receiving correction area information from the external electronic device through a communication module, wherein the correction area information is based on the metadata and information associated with an image area identified from the second image and wherein the correction area information comprises a plurality of maps, and performing correction using the first image based on at least part of the correction area information, wherein the plurality of maps are related to a result of object recognition of at least one object in the second image and a result of texture recognition in the second image.

* * * * *